US006256390B1

(12) United States Patent
Okuyama et al.

(10) Patent No.: US 6,256,390 B1
(45) Date of Patent: Jul. 3, 2001

(54) DEVICE HAVING A DIGITAL INTERFACE AND A NETWORK SYSTEM USING SUCH A DEVICE AND A COPY PROTECTION METHOD

(75) Inventors: Takehiko Okuyama; Kenji Shimoda, both of Kanagawa-ken; Kenjiro Endoh, Tokyo, all of (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/245,315

(22) Filed: Feb. 5, 1999

Related U.S. Application Data

(62) Division of application No. 09/042,301, filed on Mar. 13, 1998, now Pat. No. 5,987,126.

(30) Foreign Application Priority Data

Jul. 15, 1996 (JP) .................................................. 8-184881
Sep. 19, 1996 (JP) .................................................. 8-248110
Jun. 2, 1997 (WO) .................................................. PCT/JP97/01873

(51) Int. Cl.[7] ........................................................ H04L 9/00
(52) U.S. Cl. ........................................... 380/201; 380/204
(58) Field of Search .................................... 380/201, 202, 380/203, 204

(56) References Cited

U.S. PATENT DOCUMENTS 5,778,064 * 7/1998 Kori ...................................... 380/203
5,883,959 * 3/1999 Kori ...................................... 380/203
5,987,126 * 11/1999 Okuyama et al. ..................... 380/203
6,118,871 * 9/2000 Okuyama et al. ..................... 380/204

FOREIGN PATENT DOCUMENTS 0 860823 * 8/1998 (EP) .
1-227270 9/1989 (JP) .
5-258463 10/1993 (JP) .
6-124539 5/1994 (JP) .

OTHER PUBLICATIONS

P1394 Standard for a High Performance Serial Bus ( IEEE 1394—1995 ).

* cited by examiner

Primary Examiner—Salvatore Cangialosi
(74) Attorney, Agent, or Firm—Pillsbury Winthrop LLP

(57) ABSTRACT

A copy flag detecting circuit in a device detects the copy generation management information. This copy generation management information is inserted in the CIP header of the IEEE 1394 packet for transmission. The copy flag detector of the 1394 interface in the device detects the copy generation management information in the CIP header. According to the detection result, the copy generation managing circuit records new copy generation management information and the recording controlling circuit permits or prohibits recording. Thus, there is no need for a decoding circuit at a receiving device.

3 Claims, 22 Drawing Sheets

| H | SC | SC | VA | VA | VA |
|---|---|---|---|---|---|
| A0V0V1V2V3·· ||||||
| A1V15V16V17·· ||||||
| A2V30V31V32·· ||||||
| A3V45V46V47·· ||||||
|  ||||||
| A8V120··V133V134 ||||||

HEADER

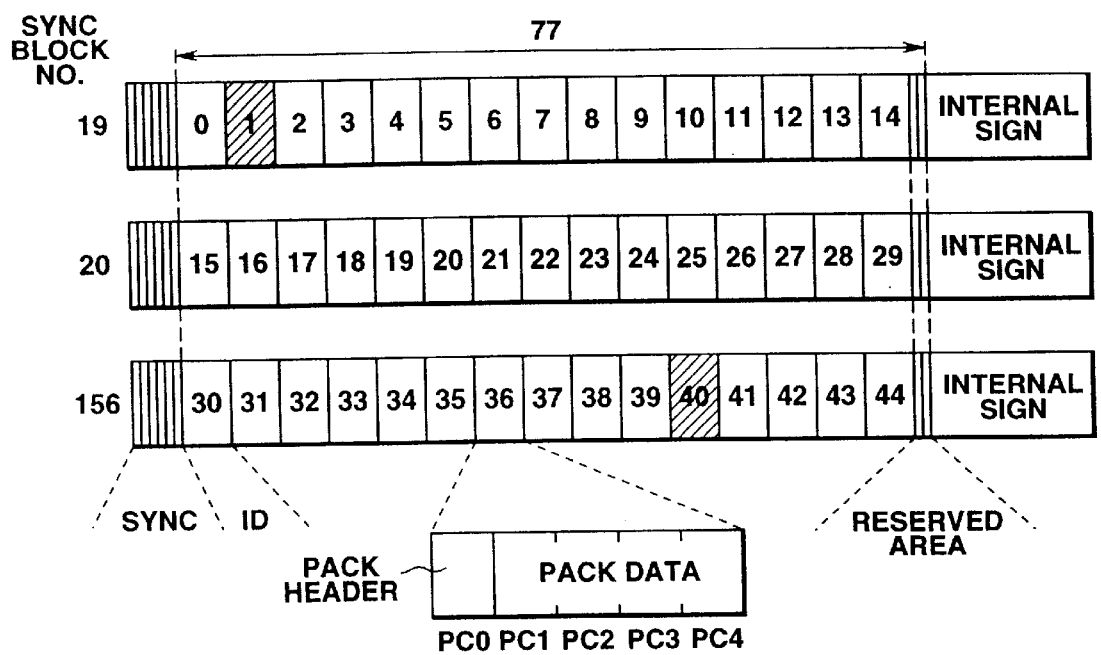

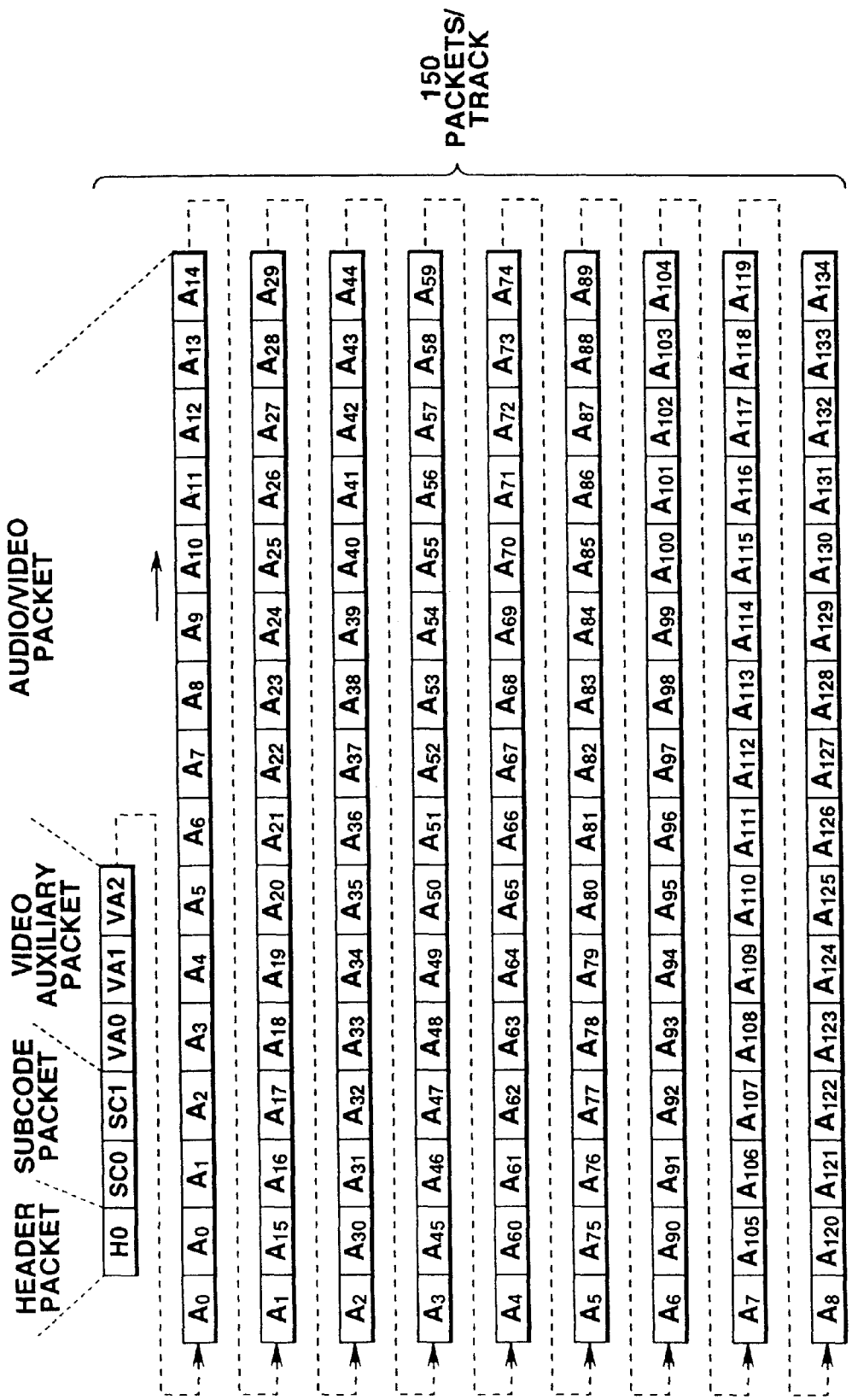

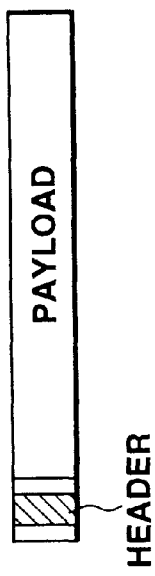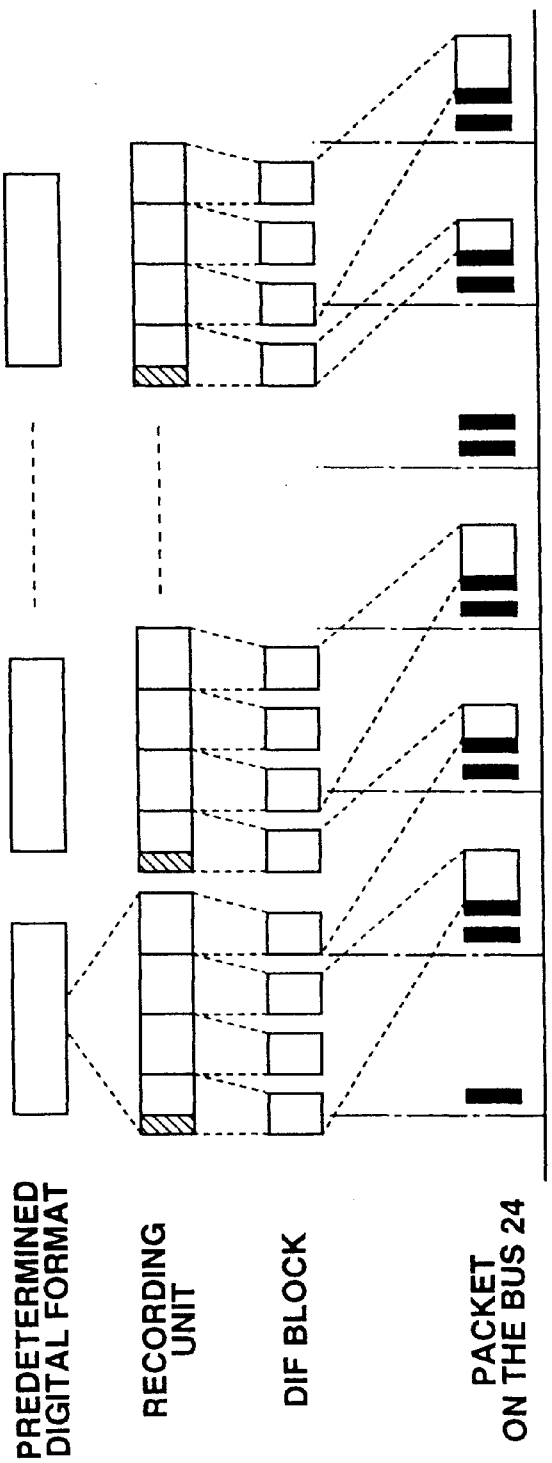

FIG.18

|  | t CODE | COMMENT |
|---|---|---|
| IEEE1394 | Ah | ISOCHRONOUS PACKET |
| DEFINITION IN THIS EMBODIMENT | Ah | ISOCHRONOUS PACKET WITHOUT CCI |
|  | Ch | ISOCHRONOUS PACKET FOR VIDEO CONTENTS (BASE SYSTEM) |
|  | Dh | ISOCHRONOUS PACKET FOR AUDIO CONTENTS (EXTENDED SYSTEM) |

FIG.20

| ISOCHRONOUS PACKET | CCI | |
|---|---|---|
|  | VIDEO CONTENTS | AUDIO CONTENTS |
| FIRST CYCLE | 01 | 01 |
| SECOND CYCLE | 01 | 01 |
| THIRD CYCLE | 01 | 01 |
| FOURTH CYCLE | CGMS (11, 10, 00) | CGMS (11, 10, 00) |
| FIFTH CYCLE | APS (00, 01, 10, 11) | APS (00, 01, 10, 11) |
| SIXTH CYCLE | DSB (1*, 0*) | DSB (1*, 0*) |
| SEVENTH CYCLE | RESERVED (NOT 01) | SCMS (11, 10, 00) |
| EIGHTH CYCLE | RESERVED (NOT 01) | RESERVED (NOT 01) |

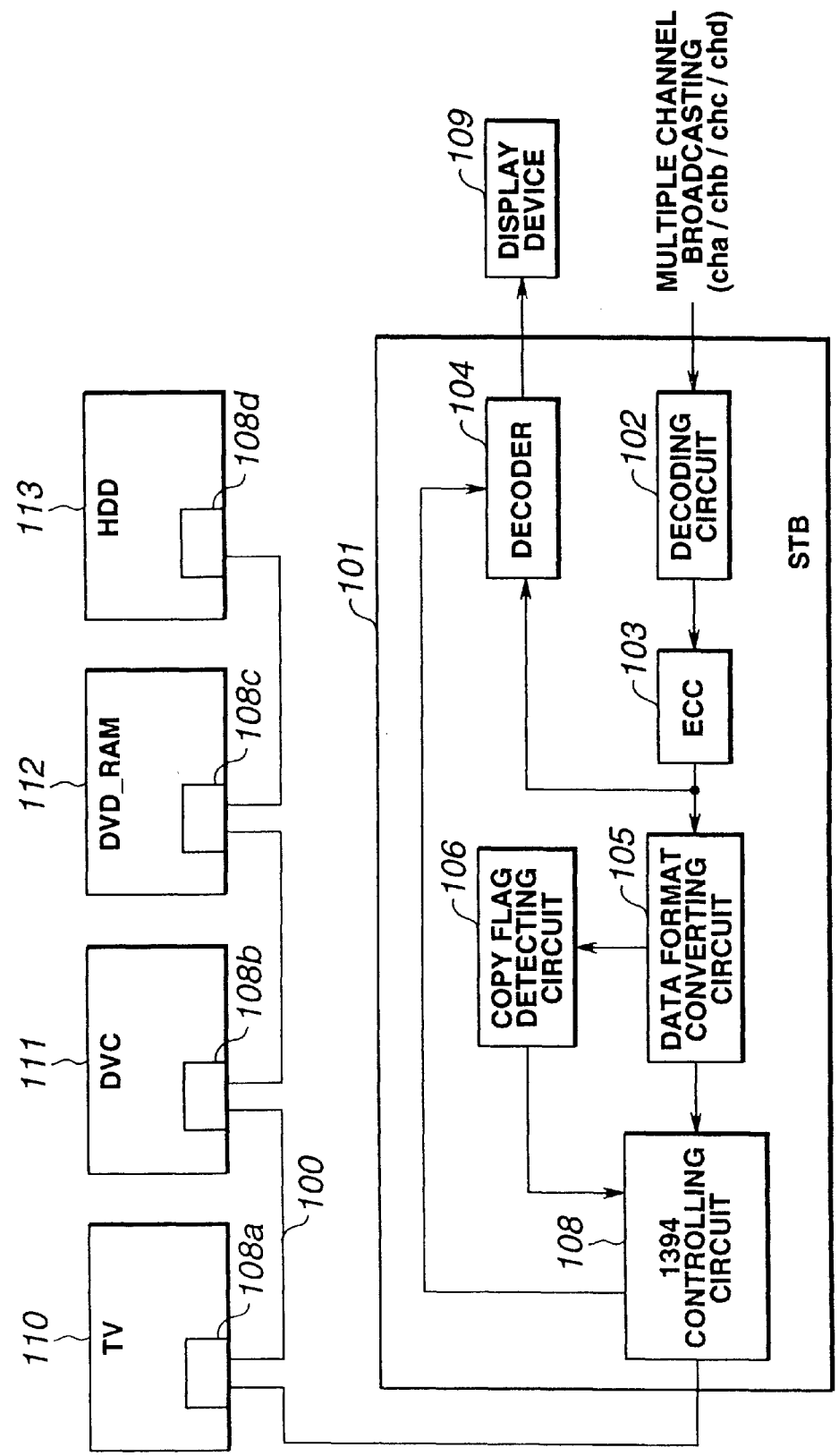

FIG.27

| ADDRESS ID | | | | |
|---|---|---|---|---|
| ORIGIN ID | | | | |
| NO. OF RECEIVING REQUEST CHANNEL ||||||
| CRC ||||||

FIG.28

| ADDRESS ID | | | | |
|---|---|---|---|---|
| ORIGIN ID | | | | |
| NO. OF RECEIVING SPECIFICATION (PERMIT) CHANNEL ||||||
| CRC ||||||

FIG.29

SYNCHRONOUS SIGNAL CHANNEL NO.

| DATA LENGTH | | | | |
|---|---|---|---|---|
| HEADER CRC |||||
| ISOCHRONOUS DATA |||||
| DATA CRC |||||

FIG.32

| ADDRESS ID | | | | |
|---|---|---|---|---|
| ORIGIN ID | | | | |
| COMMAND HEADER REPRESENTING THE ORDER FOR PACKET ORDER RESTRICTION ||||||
| PACKET ORDER<br>005, 00A, 001, 004, 010, 013, 002, 006, 00C, ········ |||||
| CRC |||||

FIG.33

| ADDRESS ID | | | | |
|---|---|---|---|---|
| ORIGIN ID | | | | |
| NO. OF RECEIVING SPECIFICATION (PERMIT) CHANNEL<br>(NO. OF RECEIVING REQUEST CHANNEL) |||||
| CRC |||||

DEVICE HAVING A DIGITAL INTERFACE AND A NETWORK SYSTEM USING SUCH A DEVICE AND A COPY PROTECTION METHOD

This is a division of application Ser. No. 09/042,301, filed Mar. 13, 1998, now U.S. Pat. No. 5,987,126.

FIELD OF THE INVENTION

The present invention relates to a devise-having a digital-interface having a copy protection function and a network system using such a device and a copy protection method.

BACKGROUND OF THE INVENTION

Recently, digitalization of audio and visual processing has become wide spread. A DVC (Digital Video Cassette Recorder) for digital recording and reproduction is also being developed. Digitalization prevents noises from entering the transmission and recording so that the signal quality is improved. In such digital recording, the original can be completely exactly duplicated. It is, however, desirable to protect the copyright of information recorded on the recording media.

In particular, provisions for copyright protection of animation images including sound data are being specified by the organizations concerned. They include the VHRA (Video Home Recording Act), which has been proposed in Japan and is currently being discussed in the United States. The VHRA specifies that the analog connection using analog devices as sources shall adopt the macro-vision method or CGMS-A (Copy Generation Management System-Analog) method, and that the analog connection using digital devices as sources shall adopt the macro-vision method, and that the digital connection using digital devices as sources shall adopt the CGMS-A (Copy Generation Management System-Analog) method or the CGMS-D (Copy Generation Management System-Digital) method.

The macro-vision method used in the analog connection overlays the copy guard signal during the vertical flyback time of the video signal to make normal recording difficult. That is, this method changes the synchronous signal level of the image to make the synchronous detection by a recording device impossible and also changes the burst phase to make the normal color reproduction by a recording device difficult. Thus, the image signal with overlaid copy guard signals prevents normal image recording without any particular procedure by a recording device.

In addition, the CGMS-A method inserts a flag to indicate whether the data can be copied or not in a predetermined horizontal period during the vertical flyback time of the video signal, and the recording device controls its recording according to the flag.

The CGMS-D method used in the digital connection adds a two-bit copy generation management information to the recording format or the digital interface format (data format for transmission) peculiar to devices such as digital VCRs and DVDs. Reproduction devices always insert a copy generation management information into the output signal and recording devices detect the copy generation management information from the input signal to control recording.

The copy generation management information indicates that copying is prohibited with "11", and that copying is allowed only once with "10", and that copying can be made freely with "00". When the copy generation management information contained in the input signal is "10", recording devices record the input signal and change the copy generation management information to "11" (copy prohibition) during recording. This means that the signal cannot be copied again.

For the digital VCR (hereinafter also referred to as DVC), the Consumer Digital VCR Association of Japan established SD (Standard-Definition) Standards corresponding to the NTSC or PAL standards and HD (High Definition) Standards corresponding to the high definition TV. These SD and HD standards (hereinafter collectively referred to as DVC standards) already have provisions about the recording format and the digital interface format for the copy generation management information in the DVC. That is, for both of the recording format and the digital interface format, the copy generation management information is inserted in the source control packet in the VAUX area to be described later.

In addition to the DVC standard, it is specified that the copy generation management information will be inserted in the header of the MPEG2 transport stream. However, other standards do not consider CGMS-D, and have no provision for where in the packet or interface format of various digital signals and devices the copy generation management information shall be inserted.

According to the standard currently under discussion by the IEC (International Electrotechnical Committee), a device handling various images will record the copy generation management information in its recording digital data and will output the digital interface output including the copy generation management information in data reproduction. In addition, it is specified that a recording device to record such interface output will detect the copy generation management information and record the data corresponding to it.

Meanwhile, network systems have been recently developing with the progress of multimedia. The multimedia technology requires not only data transmission between personal computers, but also data transmission with audio and video devices (hereinafter referred to as AV devices).

For this purpose, a unified standard of digital interface method for data transmission between a computer and a digital image device is being studied. As a low-cost peripheral interface suitable for multimedia application, IEEE (The Institute of Electrical and Electronics Engineers, Inc.) 1394 is most likely to be adopted.

IEEE 1394 enables multiple data transmission for a plurality of channels. In addition, IEEE 1394 has an isochronous transmission function to ensure transmission of video and sound data in a specified time and is considered to be a digital interface suitable for image transmission.

For IEEE 1394, detailed commands are currently specified in DVB-WG (for European digital broadcasting) of the Digital VCR Association, R4.1 of EIA discussing DTV (Digital TV) decoder in the U.S., and IEEE 1394 T.A. (Trade Association). IEEE 1394 is originally based on computer technologies, but since it is capable of synchronous communication, audio and video equipment manufacturers are also working for standardization. The proposal from the Digital VCR Association is also discussed in 1394TA.

Detailed contents of IEEE 1394 are described in an article entitled "Comparison of Three New Interfaces Searching for the Post-SCSI Design Concept" on pp. 152 to 163 of Nikkei Electronics (No. 612, dated Jul. 4, 1994) (Literature 1). IEEE 1394 is also described in detail in the Japanese Patent Application Laid-open No. Heisei 8-279818.

IEEE 1394 enables multiple-transmission for a plurality of channels and achieves transmission of video data from a plurality of devices, using a plurality of channels assigned to the isochronous packet. For the digital interface of IEEE 1394, however, no rule about copy protection is specified. According to IEEE 1394, the data in the digital interface format of various devices such as DVC transmission format (hereinafter referred to as D-interface format) and MPEG2 transport packet, are just transmitted with format conversion.

Therefore, when data are transmitted using IEEE 1394 to copy an image, the recording device fetches data from the data flowing in the bus of IEEE 1394, and restores the fetched data to the digital interface format peculiar to the reproduction device, and then, extracts the inserted copy generation management information. The copy generation management information is obtained by detecting the insertion position of the copy generation management information with its digital interface processing section or recorded and reproduced data processing sections, such as an error correction circuit. For example, when the transmitted data is DVC data, copying is controlled according to whether the predetermined 2-bit data in the source control packet in VAUX is "11" or "10" or "00".

FIG. 1 is a block diagram showing a device having a digital interface according to IEEE 1394 standard. FIGS. 2 and 3 illustrate the D-interface format and MPEG2 transport stream, respectively.

Reproduction (sending) devices 1 and 2 are DVC and DVD, respectively. These reproduction devices 1, 2 and a recording (receiving) device 3 are connected by a bus 25 corresponding to IEEE 1394's Midard. After predetermined processing of signals for the reproduced data with a reproduction processing circuit 4, the reproduction device 1 converts the reproduced data into D-interface format data using a D-interface format output processing circuit 5.

FIG. 2 shows the format of the data from the D-interface format output processing circuit 5. In the D-interface format as the digital VCR standard, data in a single record track of VCR are converted to 150 packets so that the data are transmitted by the unit of 150 packets.

At the head of such 150 packets, a header packet H is laid out. It is followed by two subcode packets SC and three video auxiliary packets VA. Then, nine audio packets A0 to A8 corresponding to nine sync blocks and 135 video packets V0 to V134 corresponding to 135 sync blocks. The copy generation management information is inserted in the source control packet in the shaded video auxiliary packet VA. Further, the reproduced data are supplied to a 1394 interface 6, converted to IEEE 1394 packets, and then sent to the bus 25.

The reproduction device 2 processes the signals of the reproduced data using a reproduction processing circuit 7. The data from the reproduction processing circuit 7 is supplied to the MPEG TS output processing circuit 8 and converted to the transport stream according to the MPEG2 standard.

FIG. 3 shows the transport stream. The transport stream supports multiple programs (channels) and can select the packet of the desired program from a plurality of programs transmitted by time sharing in the decoding process. For this selection, the transport stream is transmitted with an additional link level header (shaded part) before the payload for information transmission as shown in FIG. 3. Among 188 bytes of the transport packet, 4 bytes represent the link level header. The copy generation management information is inserted in this header. The transport stream of MPEG2 is converted to IEEE 1394 packets by a 1394 interface 9, and then sent out to the bus 25.

The recording device 3 has a 1394 interface 10, which fetches IEEE 1394 packets in the data from the reproduction devices 1, and 2 flowing in the bus 25, and depackets them. The 1394 interface 10 outputs the depacketed data to the corresponding decoders. Specifically, the received data based on the data from the reproduction device 1 are supplied to a D-interface decoder for DVC 11 and the received data based on the data from the reproduction device 2 are supplied to a TS decoder, for MPEG2 12. Data of other types are similarly supplied to the corresponding decoders. In FIG. 1, decoders corresponding to other types of data are represented by a D-interface decoder for other data 13.

The decoders 11, 12, 13 decode the input data. The decoding results are supplied to a format converting circuit 17 via flag detecting circuits 14, 15, 16. The format converting circuit 17 converts the input data to the data in its own recording format and supplies them to a recording processing circuit 18.

The flag detecting circuits 14, 15, 16 detect the copy generation management information in the output from the decoders 11, 12, 13, respectively, and output the information to a recording controlling circuit 19. The recording controlling circuit 19 controls recording (copying) by the recording processing circuit 18 according to the detected copy generation management information.

IEEE 1394 allows connection a maximum of 63 nodes to the bus 25. For the copy generation management information, the recording device is required to be capable of recognizing and detecting the digital interface format peculiar to the received data. In other words, when several types of data are received and recorded, the recording device is required to support all types of received data, which results in increase of its circuit scale. This further means that it can support the digital interface formats for which the standards have been already set, but cannot support digital interface formats having no set standards yet.

It is also possible to copy the video data with a data streamer, which does not have any image decoding circuit and only records the video data. At present, such a data streamer is not considered as the subject to which the copy generation management information rule is applied, but it may be subject to restriction in the future. However, as described above, a decoder corresponding to various received data is required to detect the copy generation management information from the data received via the bus of IEEE 1394. Even a data streamer, which originally does not need any decoder, may require a decoding circuit for detection of the copy generation management information only.

Since IEEE 1394 allows connection of 63 nodes to a bus, it is possible to make 63 copies at a time. Such copying is allowed under the current rule, but cannot be overlooked from the viewpoint of copyright protection.

Thus, it is an object of the present invention to provide a device, having a digital interface which can support any format other than existing ones and can reduce the circuit scale by enabling recording based on the copy generation management information, regardless of the format used in the data recorded by the recording device and to provide a network system and a copy protection method using such a device.

It is another object of the present invention to provide a device having a digital interface which can eliminate the need of a decoding circuit even when the recording device records data according to the copy generation management information and to provide a network system and a copy protection method using such a device.

It is yet another object of the present invention to provide a device having a digital interface which can enable reproduction of a single copy or a predetermined number of copies only at a time even when a plurality of nodes can be connected and to provide a network system and a copy protection method using such a device.

It is still another object of the present invention to provide a device having a digital interface which can execute the copy generation management based on the copy control information without any problem, even when the types of the digital video devices connected to IEEE 1394 increase or a new digital video device with a new digital interface format is connected to IEEE 1394 and to provide a network system and a copy protection method using such a device.

SUMMARY OF THE INVENTION

A device having a digital interface includes a first detector which detects from the data in a predetermined data format containing the copy generation management information, the copy generation management information, and a first interface which converts the above data in a predetermined format to the data in the data format of the network bus and inserts the copy generation management information based on the detection result of the first detector in a data format corresponding to the data format of the network bus into the data after format conversion before sending the data to the network bus.

The first detector detects the copy generation management information from the data in a predetermined data format. The first interface converts the data in a predetermined data format to the data in the data format of the network bus and inserts the copy generation management information based on the detection result of the first detector with the format corresponding to the data format of the network bus. Thus, the copy generation management information is made detectable in the process to restore the data format corresponding to the network bus to the original data format at the receiving side.

Such a device also includes a second interface which receives the transmission data obtained by conversion of the data in a predetermined data format containing the copy generation management information into the data format of the network bus with the copy generation management information inserted in the data format corresponding to the data format of the network bus via the network bus and which restores the data format of the received data from the data format of the network bus to the original data format before output, a second detector which detects the copy generation management information contained in the data received by the second interface, and recording controller which, according to the detection result of the second detector, permits or prohibits recording of the output from the second interface.

The data from the first interface are received by the second interface and restored from the data format corresponding to the network bus to the original data format. The second detector detects the copy generation management information inserted in the received data. According to this detection result, the recording controller permits or prohibits recording of the output from the second interface.

A copy protection method includes detecting, from the data in a predetermined data format containing the copy generation management information, the copy generation management information, and converting the data in a predetermined data format to the data in the data format of the network bus which inserts the detected copy generation management information in a data format corresponding to the data format of the network bus into the data after format conversion before sending the data to the network bus.

The copy generation management information is detected from the data in a predetermined data format. The data in a predetermined data format are converted to the data in the data format of the network bus. The copy generation-management information detected here is inserted with the format corresponding to the data format of the network bus.

A copy protection method includes receiving the transmission data obtained by conversion of the data in a predetermined data format containing the copy generation management information into the data format of the network bus together with the copy generation management information inserted in the data format corresponding to the data format of the network bus via the network bus and restoring the data format of the received data from the data format of the network bus to the original data format before output, detecting the copy generation management information contained in the received data, and permitting or prohibiting recording of the received data according to the copy generation management information detected.

The received data are restored from the data format corresponding to the network bus to the original data format. The copy generation management information inserted in the received data is detected and, according to this detection result, recording of the received data is permitted or prohibited.

A network system includes, at the sending side, a first detector which detects, from the data in a predetermined data format containing the copy generation management information, the copy generation management information, and a first interface which converts the data in a predetermined data format to the data in the data format of the network bus which inserts the copy generation management information based on the detection result of the first detector into the data after format conversion with the data format corresponding to the data format of the network bus before sending the data to the network bus, and at the receiving side, a second interface which receives the data sent from the first interface to the network bus and restores the data format of the received data from the data format of the network bus to the original data format before output, a second detector which detects the copy generation management information contained in the data received by the second interface, and recording controller which permits or prohibits recording of the output from the second interface according to the detection result of the second detector.

The copy generation management information is inserted in the transmission data from the sending side corresponding to the data format of the network bus. The receiving side detects the inserted copy generation management information to control copying of the received data.

A device having a digital interface includes a fourth detector which detects the copy generation management information for each channel from the multi-channel data each containing the copy generation management information and re-specifier which sends the multi-channel data to the bus capable of synchronous transmission of the multi-channel signals and, when the channel for which copying is prohibited by the copy generation management information detected by the fourth detector is included in receivable channels at a predetermined receiving device, changes the specification of the receivable channels.

The fourth detector detects the copy generation information for each channel. When the channels under copy prohibition specification are to be received by the receiving device, the re-specifier means does not specify these channels as receivable for the receiving device. Thus, copying is prohibited for this receiving device.

A network has a plurality of devices with digital interfaces connected to a network capable of transmitting a plurality of isochronous packets via the digital interfaces and includes a notifier which notifies its own device ID on the network to each of the plurality of devices with digital interfaces via the digital interfaces, a setter which specifies one or more devices as the sending device so that it outputs the isochronous packets to the network via the digital interfaces and specifies one or more remaining devices as the receiving device, a converter which, at the sending device, converts the format of the transmission data into the data format configured for each channel number determined by the digital interfacing means and outputs the result as the isochronous packets to the network, a channel number request notifier, which requests the receivable channel numbers to be sent from the digital interfaces of the receiving device to the digital interfaces of the one or more sending devices, a channel number specifier to have the digital interface of any device in the network specify one or more receivable channel numbers to the digital interfaces of the one or more receiving devices for each of the receiving device, a receiver which has the digital interface of the receiving device which has received the information from the receivable channel number specifier receive the data of one or more receivable channel numbers specified by the channel number specifier from the isochronous packets output to the network, a detector at the receiving device to detect the copy generation management information for each channel from one or more channel signals sent from the sending device, a governor which, from the device ID notified onto the network by the one or more receiving devices, judges whether each of the receiving device is capable or incapable of recording the isochronous signal flowing on the network, and a re-specifier which, when one or more receivable channel numbers specified for the digital interfaces of the receiving device capable of recording equals one or more channel numbers under copy prohibition by the copy generation management information, causes the device with the receivable channel number specifier for the receiving device to delete the one or more channel numbers under copy prohibition from the already specified one or more receivable channel numbers to re-specify the one or more receivable channel numbers for the digital interface of the receiving device.

The sending device provides copy protection against the receiving device when some of the channels (numbers) requested by the receiving device have a copy protection signal by deleting such channel numbers from the receivable channels. This achieves copy control.

A network system has a plurality of devices with digital interfaces connected to a network capable of transmitting a plurality of isochronous packets via the digital interface and includes a notifier means which notifies its own device ID on the network to each of the plurality of devices with digital interfaces via the digital interfaces, a setter which specifies one or more devices as the sending device so that it outputs the isochronous packets to the network via the digital interfaces and specifies one or more remaining devices as the receiving device, converter which, at the sending device, converts the format of the transmission data into the data format configured for each channel number determined by the digital interfaces and outputs the result as the isochronous packets to the network, a channel number request notifier to request the receivable channel numbers to be sent from the digital interfaces of the receiving device to the digital interfaces of the one or more sending devices, a channel number specifier to have the digital interface of any device in the network specify one or more receivable channel numbers to the digital interfaces of the one or more receiving devices for each of the receiving device, a receiver which has the digital interface of the receiving device which has received the information from the receivable channel number specifier receive the data of one or more receivable channel numbers specified by the channel number specifier from the isochronous packets output to the network, a detector at the receiving device to detect the copy generation management information for each channel from one or more channel signals sent from the sending device, a governor which, from the device ID notified onto the network by the one or more receiving devices, judges whether each of the receiving device is capable or incapable of recording the isochronous signal flowing on the network, and an outputter which, when one or more receivable channel numbers specified for the digital interfaces of the receiving device capable of recording equals one or more channel numbers under copy prohibition by the detected copy generation management information, causes the sending device to output the information to change the specification of the receivable channels for each of one or more receivable channel numbers to provide a recording prohibition to the equal channel numbers and a recording permit to the unequal channel numbers.

The sending device provides copy protection against the receiving device when some of the channels (numbers) requested by the receiving device have a copy protection signal by directly writing the recording permit/prohibition information for each channel in the "Receivable (Permitted) channel specification command" packet sent as the asynchronous command from the sending device and sending it to the receiving device to achieve copy control (restriction).

A network system has a plurality of devices with digital interfaces connected to a network capable of transmitting a plurality of isochronous packets via the digital interfaces and includes a notifier which notifies its own device ID on the network to each of the plurality of devices with digital interfaces via the digital interfaces, a setter which specifies one or more devices as the sending device so that it outputs the isochronous packets to the network via the digital interfaces and specifies one or more remaining devices as the receiving device, to detect a detector which detects the copy generation management information for each channel from the signals of one or more channels output from the sending device, a converter which, at the sending device, converts the format of the transmission data into the data format configured for each channel number determined by the digital interfacing means, an order changer which changes the transmission order of the data corresponding to the channel numbers equal to one or more channel numbers with copy prohibition specification by the copy generation management information among the data reconfigured for each channel number determined by the digital interface number by treating a predetermined number of packets as a unit of packet order change, an outputter which outputs the data under copy prohibition whose transmission order has been changed and the data without copy prohibition specification whose transmission order has not been changed to the network as the isochronous packets, a channel number notifier which requests one or more receivable channel numbers to be sent from the digital interfaces of the receiving device to the digital interfaces of the one or more sending devices, a channel number specifier to have the digital interfaces of any device in the network specify one or more receivable channel numbers to the digital interfaces of the one or more receiving devices for each of the receiving device, a receiver which has the digital interface of tire receiving device which has received the information from the receivable channel number, a specifier receive the data of one or more receivable channel numbers specified by the channel number specifier from the isochronous packets output to the network, a governor which, from the device ID notified onto the network by the one or more receiving devices, judges whether each of the receiving device is capable or incapable of recording the isochronous signal flowing on the network, and a first restoration key information outputter which causes the sending device upon receipt of request for the channel numbers under the copy prohibition specification as the receivable channel numbers from the receiving device incapable of recording to output the key information showing the correct order of the packets for restoration of the data after order change to the original order to the receiving devices incapable of recording only.

When some of the channels (numbers) requested by the receiving device have the copy protection signal, the sending device changes the transmission order of the packets transmitted on IEEE 1394 (transmission order scrambling) and returns the key indicating the correct packet order (Scramble cancellation key) to the devices incapable of recording together with or separately from (two asynchronous commands) the usual receivable (permitted) channel number with a response by asynchronous command, and, to the devices capable of recording, returns the usual receivable (permitted) channel numbers only or improper (dummy) scramble cancellation key together with the above usual receivable (permitted) channel numbers with a response by asynchronous command or returns no response to achieve (realize)-the copy control.

A network system has a plurality of devices with digital interfaces connected to a network capable of transmitting a plurality of isochronous packets via the digital interfaces and includes a notifier which notifies its own device ID on the network to each of the plurality of devices with digital interfaces via the digital interfaces, a setter which specifies one or more devices as the sending device so that it outputs the isochronous packets to the network via the digital interfaces and specifies one or more remaining devices as the receiving device, a detector which detects the copy generation management information for each channel from the signals of one or more channels output from the sending device, a converter which, at the sending device, converts the format of the transmission data into the data format configured for each channel number determined by the digital interface, an encrypter which, by the unit of packets, encrypts the data corresponding to the channel numbers equals one or more channel numbers with copy prohibition specification or copy permit specification for only once by the copy generation management information among the data reconfigured for each channel number determined by the digital interface number, an outputter which outputs the encrypted data under copy prohibition and the data without encryption which do not have copy prohibition specification to the network as the isochronous packets, a channel number request notifier which requests one or more receivable channel numbers to be sent from the digital interfaces of the receiving device to the digital interfaces of the one or more sending devices, a channel number specifier which specifies the digital interface of any device in the network to specify one or more receivable channel numbers to the digital interfaces of the one or more receiving devices for each of the receiving device, a receiver which has the digital interface of the receiving device which has received the information from the receivable channel number specifier receive the data of one or more receivable channel numbers specified by the channel number specifier from the isochronous packets output to the network, a governor which, from the device ID notified onto the network by the one or more receiving devices, judges whether each of the receiving device is capable or incapable of recording the isochronous signal flowing on the network, and a second restoration key information outputter which causes the sending device upon receipt of request for the channel numbers under the copy prohibition specification as the receivable channel numbers from the receiving device incapable of recording to output the proper data restoration key information for restoration of the encrypted data to the data before encryption to the receiving devices incapable of recording only.

When some of the channels (numbers) requested by the receiving device have the copy protection signal, the sending device scrambles the order of the data (numeric string) in the transmission packets on IEEE 1394 for the packets corresponding to such channels and, sends a key indicating the correct order of the data in the packets (Scramble cancellation key) to the devices incapable of recording and sends an improper (dummy) scramble cancellation key to the devices capable of recording so as to achieve (realize) the copy control.

BRIEF DESCRIPTION OF THE DRAWINGS

FIG. 9 is still another illustration of the DVC format;

FIG. 10 is yet another illustration of the DVC format;

FIG. 11 illustrates the D-interface format;

FIG. 14 illustrates the MPEG2 transport stream;

FIG. 15 is a timing chart that illustrates operation of the embodiment shown in FIG. 4;

FIG. 18 is a table illustrating tcode values;

FIG. 20 is a table illustrating the cyclic insertion method for the copy control information;

FIG. 23 is a block diagram of a fourth embodiment of the present invention;

FIGS. 27 to 29 are explanatory views of the isochronous packet and the asynchronous command;

FIGS. 32 and 33 illustrate the asynchronous command sent from STB 119 of FIG. 31.

DETAILED DESCRIPTION OF CURRENTLY PREFERRED EMBODIMENTS

Referring to the attached figures, preferred embodiments of the present invention will be described in details below. The following embodiments conform to IEEE 1394. Each device is provided with an interface according to the IEEE 1394 standard and supports its individual digital format for detection of the copy generation management information.

Figure 4:
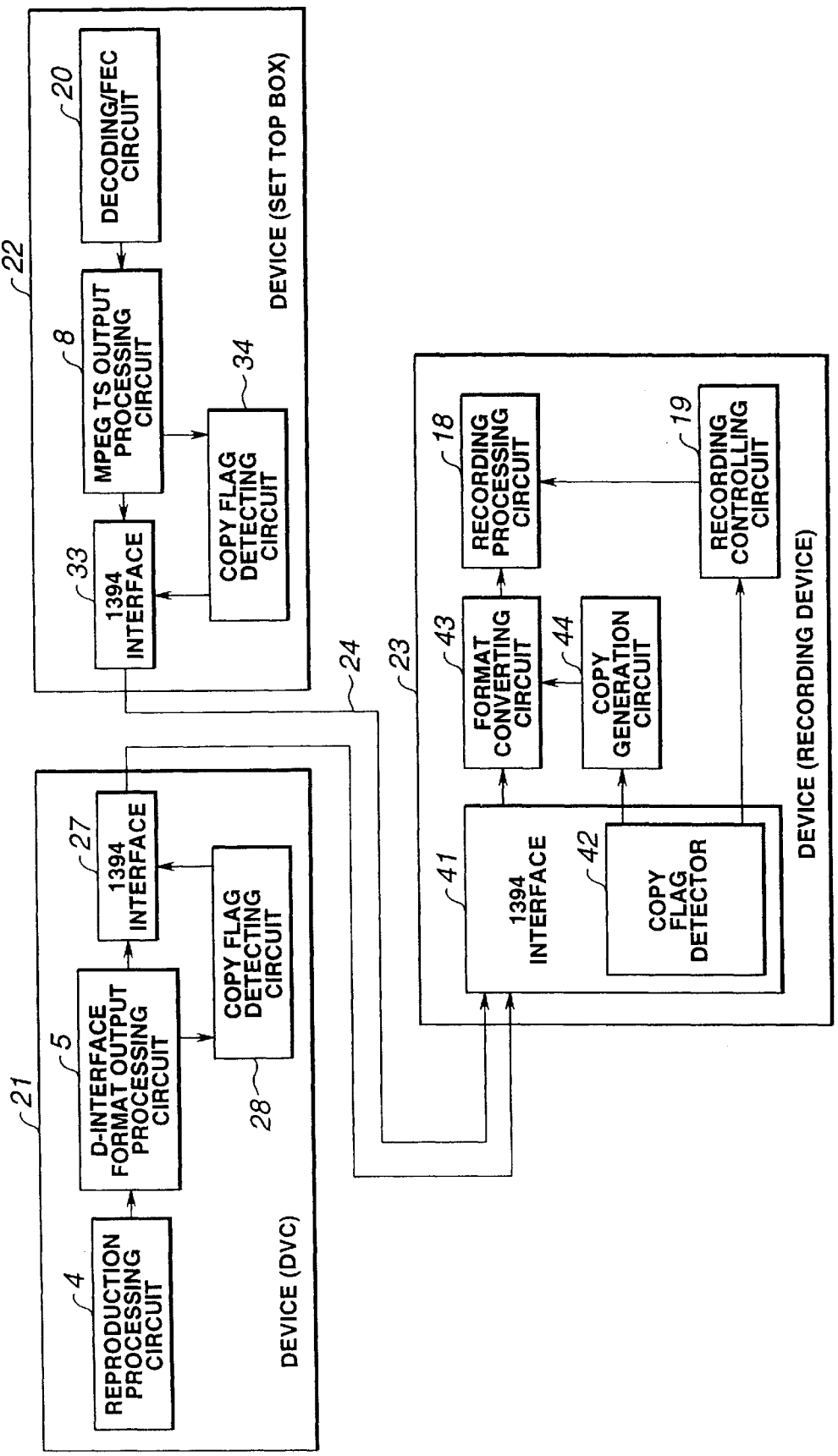
FIG. 4 is a block diagram showing an embodiment of a device having a digital interface according to the present invention.

In FIG. 4, devices 21 to 23 are connected-via a bus 24 of a digital interface capable of synchronously transmitting synchronous data, such as IEEE 1394. The devices 21 to 23 are, for example, a DVC, a DVD, or a recording device respectively. Suppose the devices 21 and 22 are sending (reproduction) devices and the device, 23 is a receiving (recording) device in the following description.

Figure 1:
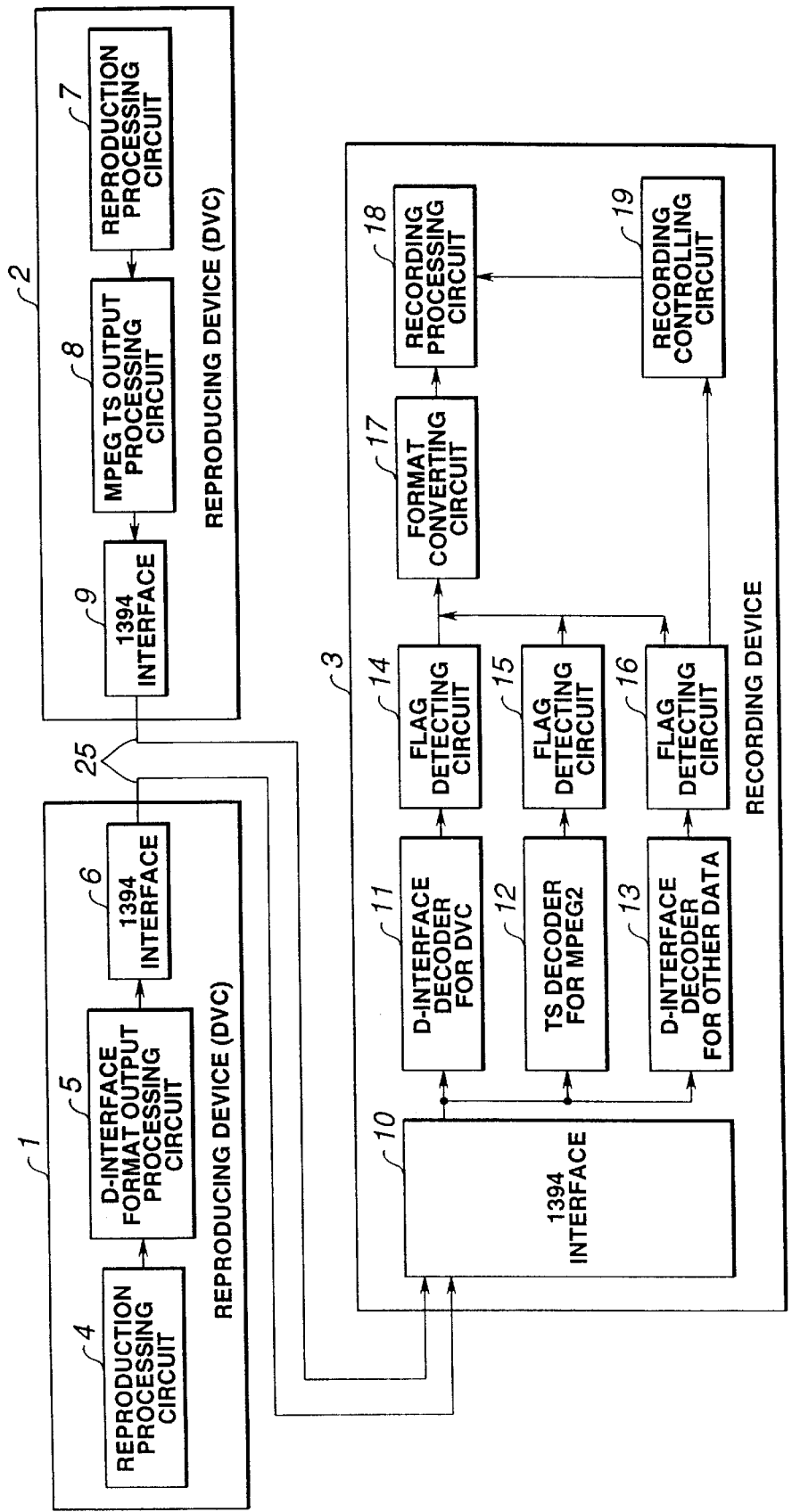
FIG. 1 shows a device having a digital interface.
Figures 2, 3:
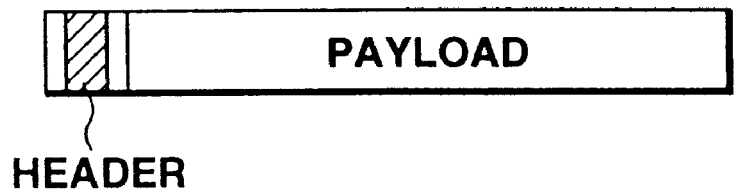
FIGS. 2 and 3 illustrate the place of insertion for the copy generation management information.

The device 21 is different from the reproduction device 1 in FIG. 1 in that it uses an 1394 interface 27 instead of the 1394 interface 6 and is provided with a copy flag detecting circuit 28. The reproduction processing circuit 4 properly processes the signals of the reproduced data from the reproduction device (not shown) and outputs them to the D-interface format output processing circuit 5. For example, the reproduction processing circuit 4 decodes the reproduced data on a magnetic tape and correct errors in the data, and then extends the data to obtain the original audio and video data.

The D-interface format output processing circuit 5 converts the input data to the D-interface format data. Specifically, the D-interface format output processing circuit 5 makes conversion between the magnetic tape recording format and the DVC standard transmission format and outputs the result to the 1394 interface 27.

Figure 5:
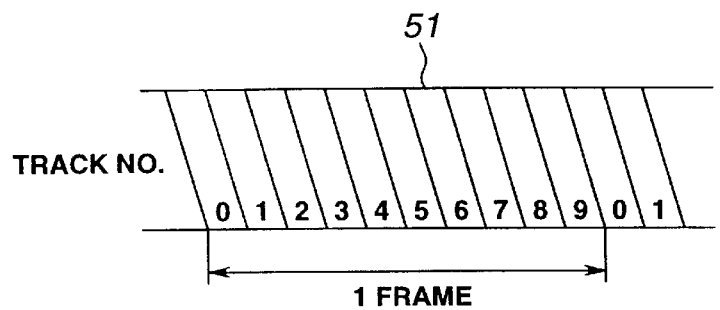
FIG. 5 illustrates the DVC format.
Figure 6:
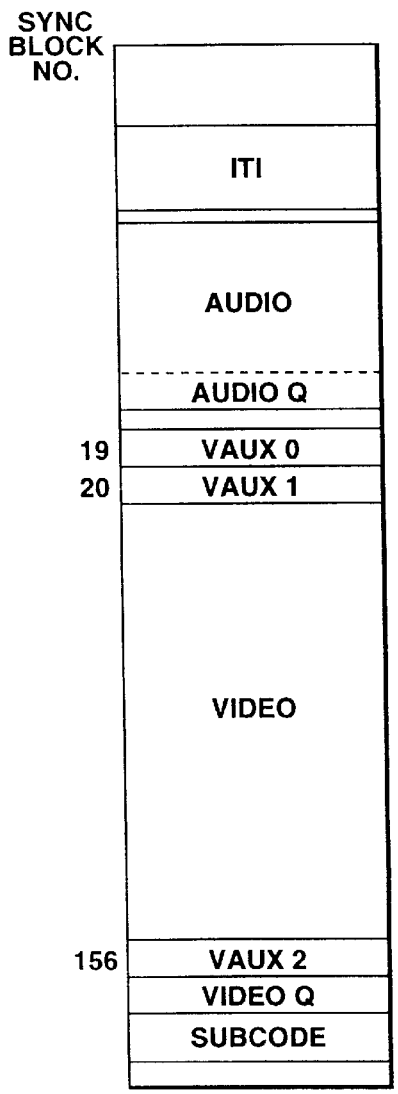
FIG. 6 is another illustration of the DVC format.
Figure 7:
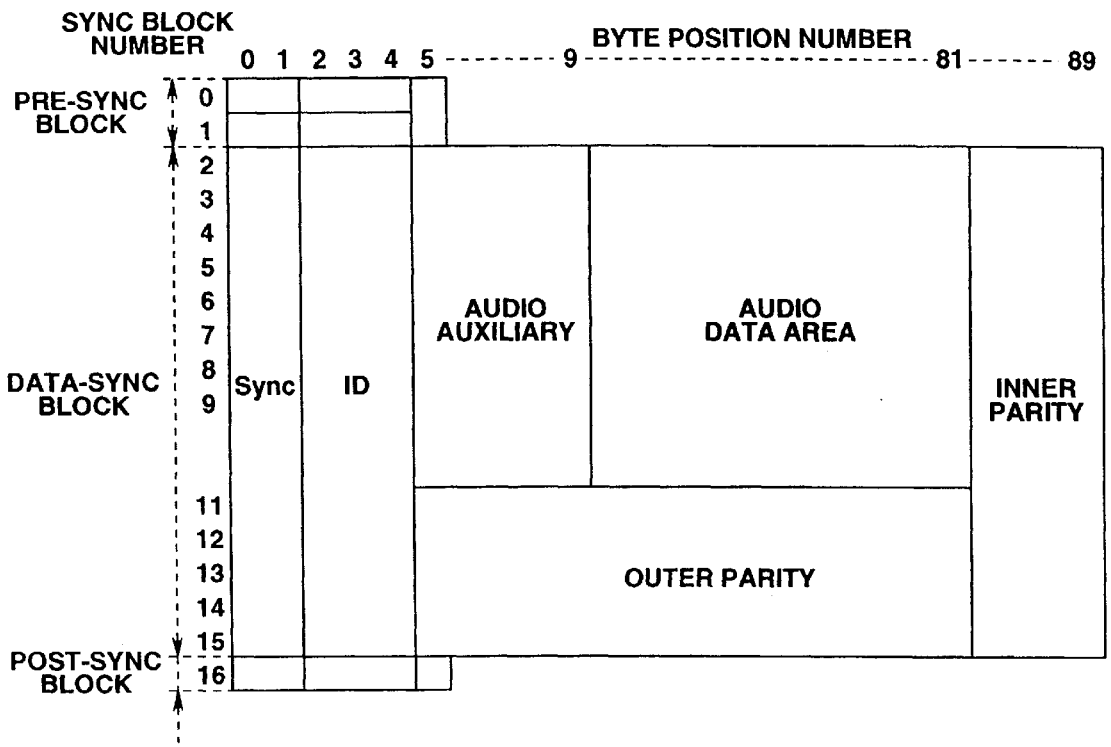
FIGS. 7 and 8 also illustrate the DVC format.
Figure 8:
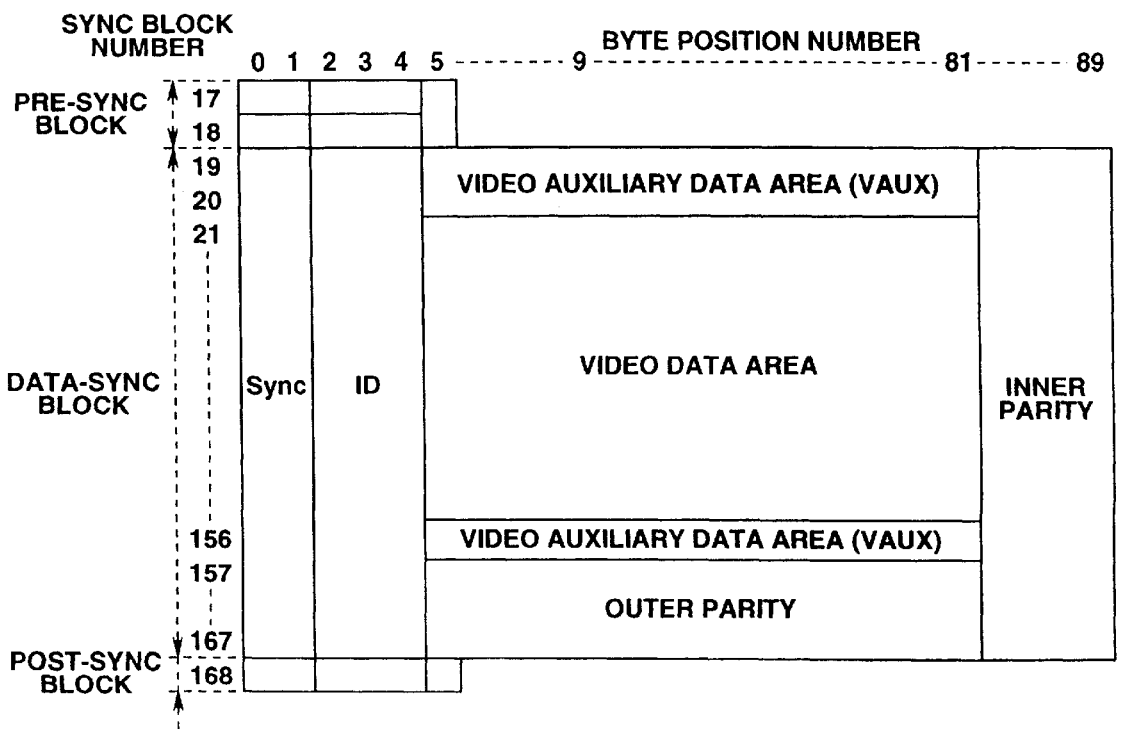

FIGS. 5 to 10 show the recording format of the device 21, which is a DVC. FIG. 5 shows recording tracks formed on the magnetic tape. FIG. 6 shows the recording format on each recording track, and FIG. 7 shows the configuration of the audio area and audio Q area. FIG. 8 shows the configuration of the video area and the video Q area, FIG. 9 shows the VAUX0 and VAUX1 formats in FIG. 6, and FIG. 10 shows the format of the source control pack in FIG. 9.

As shown in FIG. 5, according to the DVC standard, the data for a frame is recorded on a plurality of recording tracks (10 tracks) on a magnetic tape 51. FIG. 6 shows that each recording track has a plurality of areas corresponding to the data types: ITI, audio area (Audio), audio Q area (Audio Q), video auxiliary areas (VAUX0, VAUX1), video area (Video), Video auxiliary area (VAUX2), video Q area (Video Q), and subcode area (subcode). These areas are laid out from the lower end to the upper end of the tape 51. A head (not shown) traces these areas to record and reproduce these areas, one by one.

In the SD format according to the DVC standard, the data is recorded on the tracks by treating one sync block as a recording unit. As shown in FIGS. 7 and 8; each sync block has a length of 90 bytes, including two bytes of a synchronous signal (SYNC) at the leading end, a 3-byte ID, 77 bytes of data, and finally the parity consisting of internal and external signs. Specifically, the error correction processing lays out, in the video data, for example, the external signs for error correction at sync blocks 157 to 167 for the vertical data, and internal signs for error correction at bytes 82 to 89 of sync blocks 19 to 167 for the horizontal data, as shown in FIG. 8.

FIG. 9 shows a specific format of the video auxiliary areas (VAUX0, VAUX1, VAUX2) in sync blocks 19, 20, and 156. The video auxiliary areas correspond to sync blocks 19, 20, and 156.

As described above, each sync block has SYNC and ID at the beginning, which are followed by 77 bytes of data. In the video auxiliary area, 15 packs having a 5-byte length are laid out, leaving two bytes as a reserved area. As shown in FIG. 9, VAUX0 of sync block 19 has packs 0 to 14, VAUX1 of sync block 20 has packs 15 to 29, and VAUX2 of sync block 156 has packs 30 to 44. Each pack consists of one-byte pack header PC0 and 4 bytes of pack data PC1 to PC4.

According to the DVC format, the first pack of VAUX0, which is shaded in FIG. 9, is the source control pack for odd tracks, and the shaded pack (No. 40) of VAUX2 in FIG. 9 is the source control pack for even tracks.

FIG. 10 shows the specific configuration of the source control pack at the first or fortieth pack. In the source control pack, the first byte PC0 has pack header "01100001". In the second byte PC1, CGMS (Copy generation management system), ISR (Input source of just previous recording), CMP (The number of times of compression), and SS-(Source and recorded situation) are placed in this order from the MSB, each having two bits. Among them, CGMS has the two-bit copy generation management information.

Referring to FIG. 4, the reproduction processing circuit 4 supplies the format data, as shown in FIGS. 5 to 10, to the D-interface format output processing circuit 5. The copy flag detecting circuit 28 detects the copy generation management information of CGMS from the output of the D-interface format output processing circuit 5 and supplies the detection result to the 1394 interface 27.

According to the DVC format, the video data are recorded in the video area having 135 sync blocks in a track, and the audio data are recorded in the audio area having nine sync blocks. With treating one sync block as a packet, the D-interface format output processing circuit 5 converts one track into 150 packets to input and output the data by the unit of 150 packets.

FIG. 11 illustrates the packet data corresponding to one track. As shown in FIG. 11, the header packet HO is placed at the beginning of the 150 packets. It is followed by two subcode packets SC0, SC1, and three video auxiliary packets VA0 to VA2. Then, nine audio packets A0 to A8 corresponding to the nine sync blocks and 135 video packets V0 to V134 corresponding to 135 sync blocks are laid out.

Figure 12:
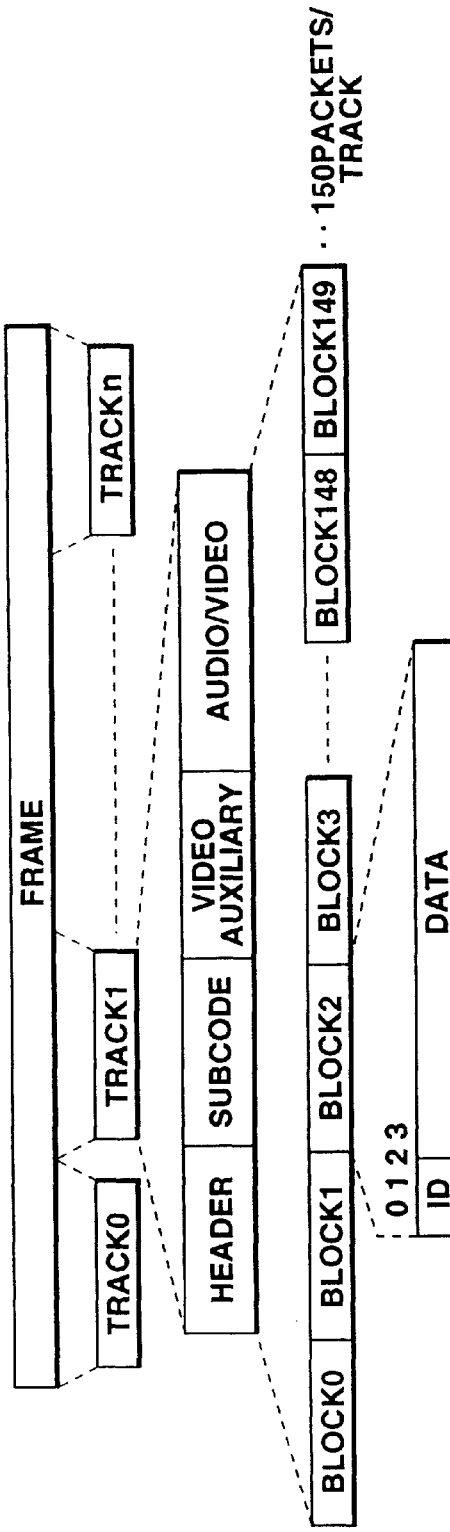
FIG. 12 is another illustration of the D-interface format.

FIG. 12 shows the data structure of the output from the D-interface format output processing circuit 5 of FIG. 4. As shown in FIG. 12, each block (DIF block) begins with the ID, which is followed by various data. The blocks in FIG. 12 correspond to the packets in FIG. 11. In other words, the blocks 0 to 149 correspond to the 150 packet data in a track. The blocks 0 to 149 transmit the header, subcodes, video auxiliary data, audio/video data for a track, and one frame is restored by the data of n tracks.

The 1394 interface 27 outputs the input packet data after converting it into the packet format of IEEE 1394. Since the data in one frame is recorded in 10 tracks according to the SD standard for the digital VCR, the data in one track may be transmitted for a period corresponding to one tenth of a frame or 3.33 ms. In other words, it is necessary to transmit 135 video blocks, nine audio blocks, three VAUX blocks, two subcode blocks, and a header block (150 DIF blocks in total) within 3.33 ms.

According to IEEE 1394, the video data are transmitted with isochronous cycles of 125 μs. The above period of 3.33 ms corresponds to 26.6 isochronous cycles. Therefore, the data for a track in the digital VTR, or 150 DIF blocks may be transmitted in 26.6 isochronous cycles. This means that five or six DIF blocks are transmitted in an isochronous cycle.

Figure 13:
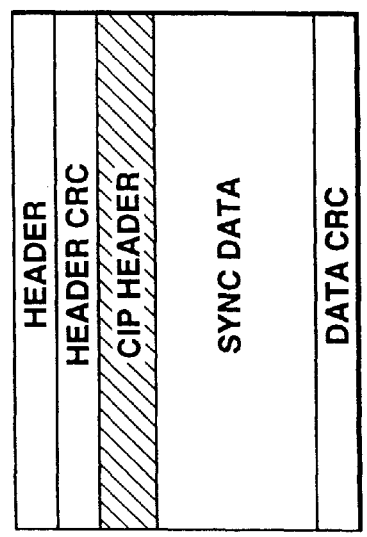
FIG. 13 illustrates the IEEE 1394 packet format.

FIG. 13 shows an isochronous packet prepared by the 1394 interface 27 of FIG. 4.

At the beginning of the packet is the header, which is followed by the header CRC for error correction. Then, the CIP header and the synchronous data of 5 or 6 DIF blocks are laid out. At the end, the error correction data CRC is positioned. In this embodiment, the 1394 interface 27 inserts the two-bit copy generation management information based on the detection result of the copy flag detecting circuit 28 into the CIP header.

According to the current standard under IEEE 1394, SID, DBS, FN, QPC, SPH, DBC, FMT, 50/60, STYPE, or SYT can be provided as the CIP header. Further, two-bit reserved areas are prepared. For example, the 1394 interface 27 inserts the copy generation management information to such reserved area.

The 1394 interface 27 sends the isochronous packets of the format, as shown in FIG. 13 to the bus 24. As described above, these isochronous packets flow on the bus 24 with the isochronous cycle of 125 μs.

The device 22 is different from the reproduction device 2 in FIG. 1 in that it uses a decoding/FEC circuit 20, instead of the reproduction processing circuit 7, and a 1394 interface 33, instead of the 1394 interface 9, and is provided with a copy flag detecting circuit 34. The decoding/FEC circuit 20 properly processes the signals of the reproduced data from the reproduction device (not shown) and outputs them to the MPEG TS output processing circuit 8. For example, the decoding/FEC circuit 20 subjects the MPEG2 standard compression data reproduced from a disk to the error correction processing. The MPEG TS output processing circuit 8 outputs the input data to the 1394 interface 33 after converting the data into the MPEG2 transport packet with the unit of 188 bytes.

FIG. 14 illustrates the transport packet from the MPEG TS output processing circuit 8. As shown in FIG. 14, a transport packet is transmitted with a link level header (shaded part) before the payload for information transmission. Among the 188 bytes of a transport packet, four bytes represent the link level header. The copy generation management information is inserted in this header.

The copy flag detecting circuit 34 detects the copy generation management information in the header of the transport packet, and outputs the detection result to the 1394 interface 33. The 1394 interface 33 has the same configuration as the 1394 interface 27. The 1394 interface 33 converts the MPEG2 transport stream into the IEEE 1394 packet as shown in FIG. 13. In this case, the 1394 interface 33 inserts the two-bit copy generation management information based on the detection result by the copy flag detecting circuit 34 into the CIP header. The 1394 interface 33 sends the isochronous packets to the bus 24.

The device 23 has an 1394 interface 41, which fetches the packets flowing on the bus 24 and depackets them so that it outputs the original format data to a format converting circuit 43. In this embodiment, the 1394 interface 41 has a copy flag detector 42. The copy flag detector 42 detects the copy generation management information inserted in the CIP header of the packet and outputs it to a copy generation managing circuit 44 and the recording controlling circuit 19.

The format converting circuit 43 converts the format of the input data to its own recording format. For example, if the device 23 is designed for recording according to MPEG2 standard, it outputs the data from the device 22 as they are (without format conversion) to the recording processing circuit 18, and converts the data from the device 21 so as to change the format from the D-interface format to the MPEG2 format before output to the recording processing circuit 18.

The copy generation managing circuit 44 is designed to insert the copy generation management information based on the detection result of the copy flag detector 42 to the position corresponding to the format after conversion when the format converting circuit 43 executes any format conversion. For example, when its own recording format conforms to the D-interface format, it inserts the copy generation management information based on the detection result of the copy flag detector 42 to the CGMS of the source control pack when the data from the device 22 are recorded. Further, when the copy generation management information detected by the copy flag detector 42 is "10" to allow recording only once, the copy generation managing circuit 44 inserts "11" to prohibit copying as the copy generation management information.

When the device 23 is a video streamer or a data streamer to record the data after depacketing as they are, it is not necessary to convert the format using the format converting circuit 43. In this case, the format converting circuit 43 may be omitted.

The recording processing circuit 18 properly processes recording signals of the data from the format converting circuit 43 so that they are recorded by a recording device (not shown). The recording by the recording processing circuit 18 is controlled by the recording controlling circuit 19. The recording controlling circuit 19 prohibits recording by the recording processing circuit 18 when the copy generation management information detected by the copy flag detector 42 is "11" for copy prohibition and allows recording by the recording processing circuit 18 when the information is "10" to allow recording only once or "00" for free copying.

Though the device 23 is supposed to be a recording device in the above description, it can be a television set. In this case, the device 23 must be able to handle both analog and digital outputs. With a copy generation managing circuit 44, the copy control information such as macro vision, CGMS-A, or CGMS-D standard-may be inserted in such outputs.

Referring now to FIG. 15, the operation of the embodiment with the above configuration is described below. FIG. 15 shows the data in a predetermined digital format, data recording units, DIF blocks, and isochronous packets on the bus 24. Note that FIG. 15 shows a digital format in general and is slightly different from the specific DVC format or MPEG2 digital format.

Suppose the devices 21, 22, 23 are recording devices for DVC, DVD, or a predetermined recording format, and the reproduced data of the device 21 is recorded by the device 23. The reproduced data is output after decoding and error correction by the reproduction processing circuit 4. The D-interface format, output processing circuit 5 converts the input data in DVC format into the D-interface format data before output.

FIG. 15 shows, at the top the digital format peculiar to the sending device and the output from the D-interface format output processing circuit 5. Note that the specific digital format of the D-interface format output processing circuit 5 is as shown in FIG. 12. In other words, these data are recorded in recording units of 150 packets. FIG. 15 just shows that a recording unit with a header packet at the beginning consists of several packets, and the number of packets does not matter.

The copy flag detecting circuit 28 detects the copy generation management information inserted in the source control pack in the video auxiliary packet VA of the DVC format and outputs the detection result to the 1394 interface 27.

The output from the D-interface format output processing circuit 5 is supplied to the 1394 interface 27 and converted into packet format according to the IEEE 1394 standard. The D-interface format output processing circuit 5 transmits several DIF blocks input for an isochronous cycle in a single isochronous packet. The third line of FIG. 15 shows DIF blocks and the fourth line of the figure shows that three or two DIF block are transmitted in a single isochronous cycle.

As described above, when the data are transmitted according to the DVC standard, the D-interface format output processing circuit 5 transmits five or six DIF blocks for one isochronous cycle. The 1394 interface 27 inserts the copy generation management information based on the detection result from the copy flag detecting circuit 28 to the CIP header of the isochronous packet. Thus, the D-interface format output processing circuit 5 outputs the isochronous packet in the format as shown in FIG. 13.

The isochronous packet from the device 21 is sent to the bus 24. The 1394 interface 41 of the device 23 fetches the isochronous packets having that device as the specified address from the data flowing on the bus 24 for depacketing. From the 1394 interface 41, the packet data in the D-interface format is output.

The copy flag detector 42 detects the copy generation management information inserted in the CIP header of the isochronous packet. The detection result of the copy flag detector 42 is sent to the copy generation managing circuit 44 and the recording controlling circuit 19. Suppose now that the copy generation management information detected by the copy flag detector 42 is "11", which prohibits copying. In this case, the recording controlling circuit 19 controls the recording processing circuit 18 to prohibit recording. For example, the recording processing circuit 18 controls the operation of the system control or servo circuit (not shown) so as to omit recording. In this case, the format conversion processing by the format converting circuit 43 may be prohibited.

Suppose the copy generation management information detected by the copy flag detector 42 is "00" for free copying. In this case, data can be recorded freely. The packet data from the 1394 interface 41 are supplied to the format converting circuit 43 so that they are converted to have recording format of the device 23.

For example, when the sending device is a DVC, if the device 23 executes recording according to the DVC format, the format converting circuit 43 converts the input data in the D-interface format into the DVC format data before being output to the recording processing circuit 18. If the device 23 executes recording corresponding to the MPEG2 format here, the format converting circuit 43 converts the data in the D-interface format corresponding to the DVC into the MPEG2 transport stream. In this case, the copy generation managing circuit 44 inserts "00" as the copy generation management information to the header of the MPEG2 transport stream.

When the sending device is a DVD, if the device 23 executes recording according to the DVC format, the format converting circuit 43 converts the MPEG2 transport stream into the DVC format data. In this case, the copy generation managing circuit 44 inserts "00" as the copy generation management information to the CGMS area of the VAUX source control pack. The data from the format converting circuit 43 is sent to the recording processing circuit 18 and recorded in the recording media (not shown).

Suppose the copy generation management information detected by the copy flag detector 42 is "10", which allows copying only once. The copy generation managing circuit 44 rewrites the copy generation management information "10" contained in the data input to the format converting circuit 43 to change it to the copy generation management information for copy prohibition ("11"). This copy generation management information is naturally inserted in the position corresponding to the recording format.

Thus, the device 23 can record data according to the copy generation management information.

Similar operation is executed when the sending device is a set top box to output MPEG2-TS. The reproduced data from the decoding/FEC circuit 20 of the device 22 are converted into the transport packets with the unit of 188 bytes by the MPEG TS output processing circuit 8. In this case, the copy generation management information is detected from the header of the transport packet by the copy flag detecting circuit 43 and supplied to the 1394 interface 33. The 1394 interface 33 converts the transport packet to the 1394 packet. In this case, the 1394 interface 33 inserts the copy generation management information detected by the copy flag detecting circuit 34 to the CIP header.

Even when the sending device conforms to a standard other than DVC or MPEG2, it is obvious that the copy generation management information can be similarly inserted in the transmission data.

Thus, it is easy for a sending device to recognize its own data format and detect the copy generation management information. The 1394 interface of the sending device sends the detected copy generation management information by inserting it to the CIP header of the 1394 packet. On the other hand, the receiving device detects the copy generation management information contained in the CIP header of the transmitted isochronous packet. In other words, the receiving device can detect the copy generation management information without caring for the received data type and without decoding the received data. Therefore, it is not necessary for a receiving device to have a decoder for detection of the copy generation management information. Even when it receives data in a format other than existing ones, it can detect the copy generation management information. Since it is not necessary to decode the received data, recording can be enabled or disabled in a short time.

Figure 16:
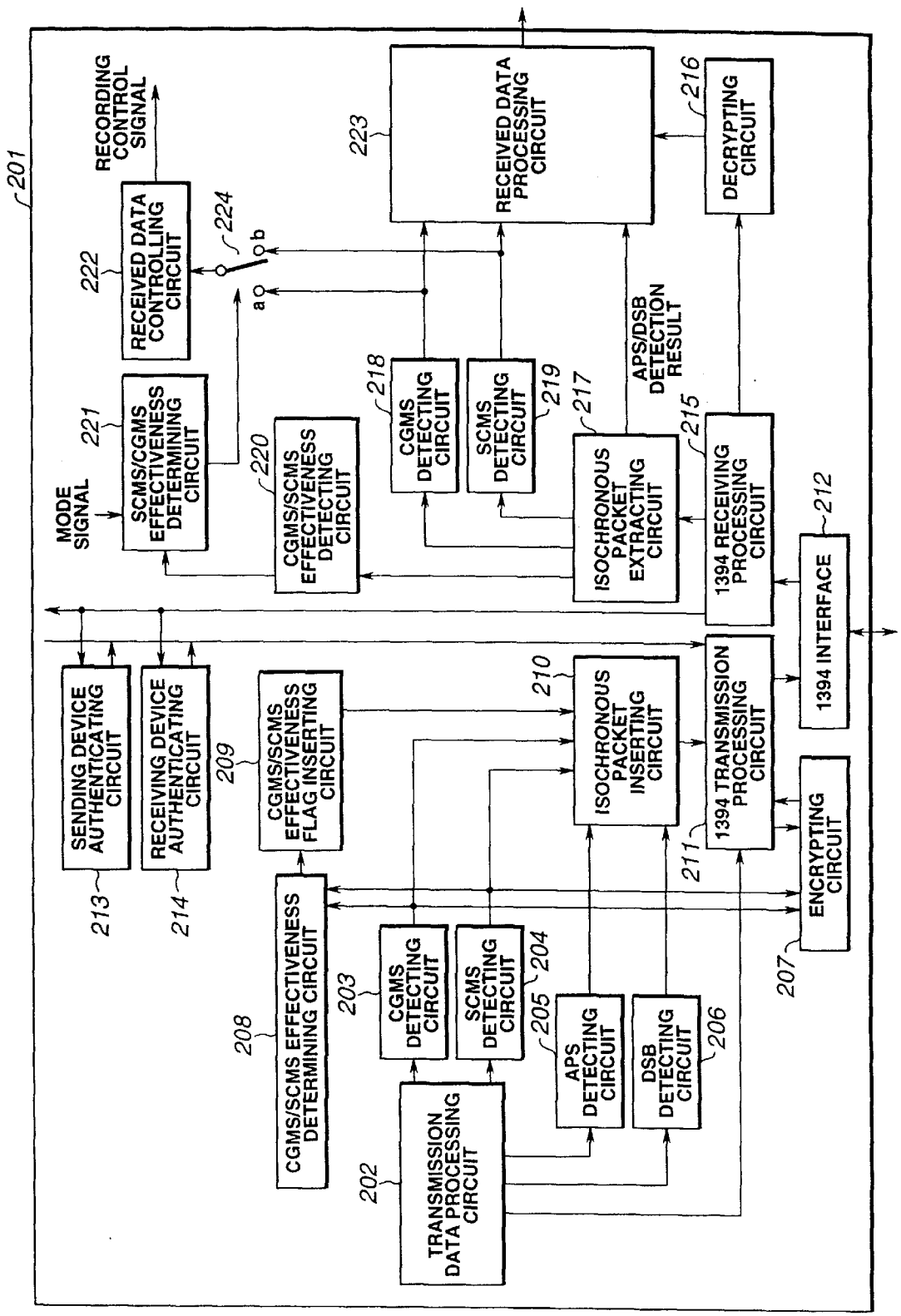
FIG. 16 is a block diagram of a second embodiment of the present invention.

FIG. 16 illustrates a second embodiment of the present invention.

In the embodiment of FIG. 4, CGMS is used as the copy generation management information to control data copying for video devices. As the copy generation management information in addition to CGMS, SCMS (Serial Copy Management System) for audio data copy control is also specified. However, SCMS is basically used in order to allow digital-digital copying of audio data for one generation, and is handled differently from CGMS. It may be sometimes necessary to use these two types of copy generation management information for copy control. This embodiment shows an example where the present invention is applied to a device to achieve copy control using these two types of copy generation management information: CGMS and SCMS.

A device having a digital interface 201 is mounted on a machine. Machines to which the device 201 may be mounted are various products, such as a machine capable of recording and reproducing the video and audio data, and a machine for recording and reproduction of other types of data. More specifically, these machines include a VCR, a DAT, a DVD, a receiver for digital broadcasting, and a data streamer.

In this embodiment, the device 201 sends, in the transmission system, the transmission data with isochronous packets according to IEEE 1394 standard, and inserts CGMS and SCMS to the transmission data. In the receiving system, it extracts CGMS and SCMS from the received data so that copying of the received data is controlled.

In the transmission system, reproduced signals from a reproduction means (not shown), for example, are supplied to a transmission data processing circuit 202 of the device 201. The transmission data processing circuit 202 outputs data corresponding to the data format it processes. For example, it may have a configuration similar to the D-interface format output processing circuit 5 and the MPEG TS output processing circuit 8 in FIG. 4. The transmission data processing circuit 202 properly processes the reproduced signals and outputs them as the transmission data to a 1394 transmission processing circuit 211.

On the other hand, the output from the transmission data processing circuit 202 is also supplied to a CGMS detecting circuit 204, an SCMS detecting circuit 205, an APS detecting circuit 206, and a DSB detecting circuit 207. The CGMS detecting circuit 204 and the SCMS detecting circuit 205, respectively, detect CGMS and SCMS contained in the output from the transmission data processing circuit 202 and output them to an isochronous packet inserting circuit 210.

In the transmission system, not only CGMS and SCMS as the copy generation management information, but also APS (Analog Protection System) which indicates whether PSP (AGC pseudo pulse in the macro vision method) is inserted or not, and DSB (Digital Source Bit) which specifies copy prohibition for a DVD-ROM disk, can be transmitted. The APS detecting circuit 206 and the DSB detecting circuit 207, respectively, detect APS and DSB contained in the output from the transmission data processing circuit 202 and output them to the isochronous packet inserting circuit 210.

Figure 17:
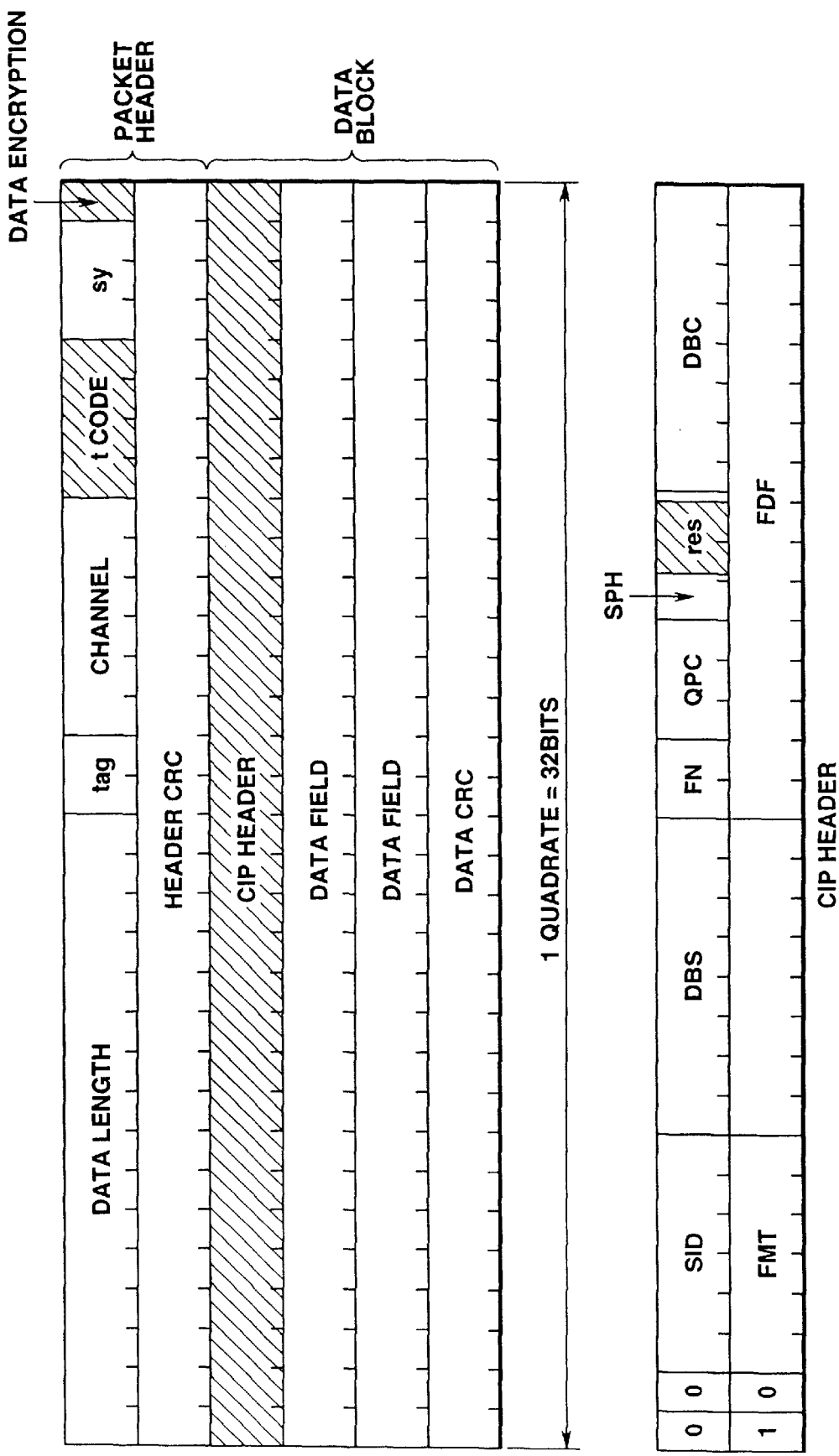
FIG. 17 illustrates the layout of the copy control information in the isochronous packet by the isochronous packet inserting circuit 210.

Note that APS and DSB may have following values:
APS
  00: PSP=off, Color stripe=off
  01: PSP=on, Color stripe=off
  10: PSP=on, Color stripe (2-line method)=on
  11: PSP=on, Color stripe (4-line method)=on
DSB
  1: DVD-ROM disk with encoded copy prohibition
  0: Other than the above The isochronous packet inserting circuit 210 inserts the copy generation management information CGMS and SCMS and the copy control information (CCI) consisting of APS and DSB into the isochronous packet. FIG. 17 illustrates the layout of the copy control information in the isochronous packet by the isochronous packet inserting circuit 210.

As shown in FIG. 15, an isochronous packet has a packet header consisting of a header and a header CRC, and a data block consisting of a CIP header (shaded part), synchronous data (data field), and a data CRC. As shown in FIG. 17, a CIP header has SID, DBS, FN, QPC, SPH, reserved area (res) (shaded part), DBC, FMT, and FDF laid out. In this embodiment, as in the embodiment of FIG. 4, the copy control information is to be inserted in the reserved area (shaded part) of the CIP header. Specifically, this reserved area accommodates not only CGMS, but also SCMS, APS, and DSB, in this embodiment.

The data, sent from the transmission system of the device 201 may contain video and audio data for example, or may contain audio data only. This means that not all of the copy control information pieces inserted in the isochronous packet are effective. Therefore, in the transmission system, information to indicate whether CGMS and SCMS inserted in the reserved area are effective or ineffective is to be inserted.

Specifically, the detection results of the CGMS detecting circuit 203 and the SCMS detecting circuit 204 are also supplied to a CGMS/SCMS effectiveness determining circuit 208. The CGMS/SCMS effectiveness determining circuit 208 determines whether CGMS and SCMS are effective or ineffective from the CGMS and SCMS detection result and outputs the determination result to a CGMS/SCMS effectiveness flag inserting circuit 209.

This embodiment shows an example where the effectiveness of CGMS/SCMS is defined using the tcode value of the header in the isochronous packet, for example, as the CGMS/SCMS effectiveness/ineffectiveness flag. This is because the tcode value is not defined now. It is not necessarily limited to tcode value.

The CGMS/SCMS effectiveness flag inserting circuit 209 determines the tcode value indicating whether CGMS and SCMS are effective or not based on the determination result of the CGMS/SCMS effectiveness determining circuit 208 and outputs it to the isochronous packet inserting circuit 210.

As shown in FIG. 17, a header has "data length", "tag", "channel", four bit "tCode" (shaded part), and sy. The isochronous packet inserting circuit 210 lays out the tcode value from the CGMS/SCMS effectiveness flag inserting circuit 209 in the tCode section of the header. FIG. 18 is a table that illustrates tcode values. According to the current IEEE 1394 standard, an isochronous packet is made recognizable by setting the tCode to Ah, as shown in FIG. 18. In this embodiment, the tcode value is set to Ah, as shown in FIG. 18, to show that the packet is the isochronous packet and that the copy control information is ineffective (there is no information). In addition, the tcode value at Ch indicates that the copy generation management information for the audio data is ineffective and the tcode value at Dh shows that the copy generation management information for the audio data is effective.

In practice, however, it is most unlikely that CGMS is ineffective and SCMS alone is effective, and FIG. 18 does not express such situation with tCode values. Such situation can be any set by other tCode values, though.

The copy control information inserted by the isochronous packet inserting circuit 210 may be of four copy control information types, which are respectively defined by the applicable organization: CGMS, SCMS, APS and DSB. The reserved area of the CIP header for transmission of the copy control information has two bits. The isochronous packet inserting circuit 210 can send these four types of copy control information in several cycles. It can insert the information cyclically with eight isochronous cycles, for example.

Figure 19:
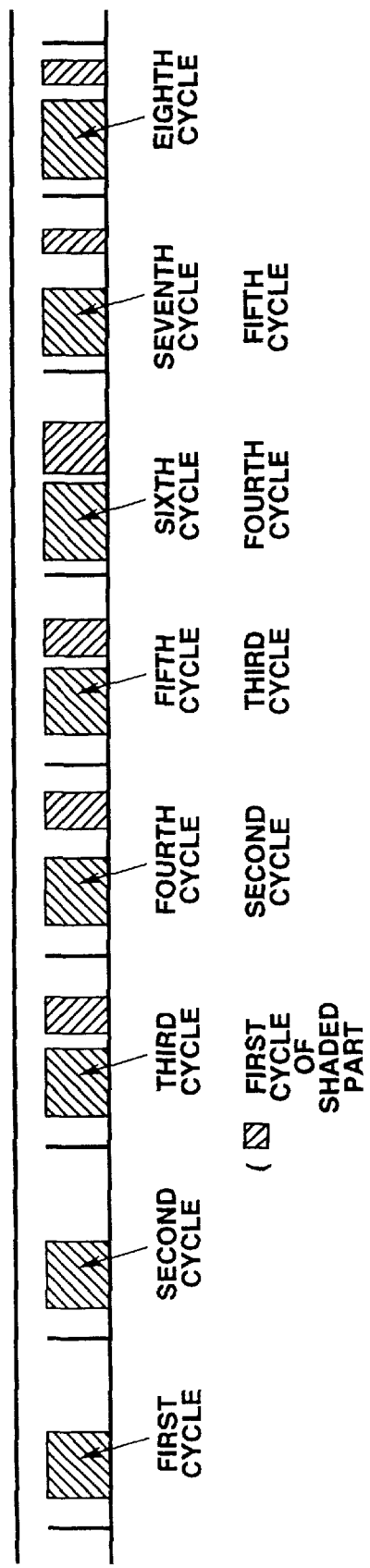
FIG. 19 illustrates the cyclic insertion method for the copy control information.

FIGS. 19 and 20 illustrate the cyclic insertion method of the copy control information.

As indicated by the shaded part in FIG. 19, the copy control information is inserted in the CIP header, or more specifically, inserted in the reserved area in the CIP header within eight isochronous cycles. The isochronous packet inserting circuit 210 sets "01" in the reserved area for the first to the third isochronous cycles, in the eight isochronous cycles, and inserts CGMS to the reserved area in the fourth isochronous cycle. Similarly, the isochronous packet inserting circuit 210 inserts APS and DBS to the reserved area of the fifth and sixth isochronous cycles, respectively. For the reserved areas of the seventh and the eighth isochronous cycles, other values than "01" are to be inserted in indicate that they are reserved areas. In other words, when the cycle subsequent to three consecutive detections of "01" has a value other than "01", it can be recognized as CGMS.

Further, the audio data can be processed by setting the reserved area of the first to the sixth isochronous cycles and the eighth isochronous cycles in the same way as for the video data. For the audio data, the isochronous packet inserting circuit 210 inserts SCMS to the reserved area in the seventh isochronous cycle.

The 1394 transmission processing circuit 211 and the 1394 interface 212 make the same operation as the 1394 interface 27 and the 1394 interface 33 of FIG. 4. Specifically, the 1394 transmission processing circuit 211 and the 1394 interface 212 convert the data in a predetermined format from the transmission data processing circuit 202 into the IEEE 1394 standard packets and send them to the transmission path (not shown).

The isochronous packet inserting circuit 210 controls the 1394 transmission processing circuit 211 to set the above-mentioned copy control information and the tcode values for the transmission data output from the transmission data processing circuit 202 to the 1394 transmission processing circuit 211.

According to IEEE 1394, device authentication shall be executed prior to the data transmission. A sending device authenticating circuit 213 can verify that the receiver is a proper sending device when it belongs to a receiving device and a receiving device authenticating circuit 214 verifies that the sender is a proper receiving device when it belongs to a sending device. The authentication key from the receiving device authenticating circuit 214 is supplied to the 1394 transmission processing circuit 211 and the authentication key from the sending device authenticating circuit 213 is supplied to the 1394 receiving processing circuit 215. The copyright protection can be further enhanced by encryption of the transmission data for copy prohibition. In this embodiment, an encrypting circuit 207 controls the 1394 transmission processing circuit 211 to encrypt the transmission data when copy prohibition or permit for copying only once is indicated by the detection result of the CGMS detecting circuit 203 and the SCMS detecting circuit 204.

When the encrypting circuit 207 executes encryption, it inserts the encryption flat indicating the encryption execution to the isochronous packet. As shown in FIG. 17, the sy area in the header is empty and, in this embodiment, the encrypting circuit 207 sets the encryption flag at the LSB of the sy area. The encryption flag indicates, for example, that the data is encrypted by "1" and that it is not encrypted by "0".

On the other hand, in the receiving system, the 1394 interface 212 and the 1394 receiving processing circuit 215 make the same operation as the 1394 interface 10 in FIG. 1. The received data received by the 1394 interface 212 and the 1394 receiving processing circuit are supplied to a decrypting circuit 216 and an isochronous packet extracting circuit 217. The decrypting circuit 216 decrypts the received data when such data have been encrypted and outputs the original data to a received data processing circuit 223.

The isochronous packet extracting circuit 217 extracts the copy control information inserted in the reserved area of the CIP header in the received isochronous packet, outputs the APS and DSB detection results to the received data processing circuit 223 and outputs CGMS and SCMS to the CGMS detecting circuit 218 and the SCMS detecting circuit 219, respectively.

The CGMS detecting circuit 218 detects the value of CGMS from the CIP header of the isochronous packet and the SCMS detecting circuit 219 detects the CGMS value from the CIP header of the isochronous packet. The detection results of the CGMS detecting circuit 218 and the SCMS detecting circuit 219 are respectively supplied to a received data controlling circuit 222 via terminals a and b of a switch 224. The received data controlling circuit 222 outputs the recording control signal to control recording based on the input copy generation management information.

The received data processing circuit 223 converts, when a recording device is receiving the data, the data received from the decrypting circuit 216 into the data in the recording format of its own recording system (not shown) and inserts CGMS and SCMS to the predetermined data positions corresponding to the recording format. In this case, the received data controlling circuit 222 changes the copy generation management information to permit copying only once to the copy generation management information for copy prohibition before insertion. The data received from the received data processing circuit 223 are supplied to the recording system.

The isochronous packet extracting circuit 217 extracts the tCode data and output them to a CGMS/SCMS effectiveness detecting circuit 220. The CGMS/SCMS effectiveness detecting circuit 220 detects tcode values from the input data and output them to an SCMS/CGMS effectiveness determining circuit 221. The SCMS/CGMS effectiveness determining circuit 221 determines whether SCMS and CGMS is effective or ineffective when given tcode values and the mode signal and controls the switch 224 according to the determination result. The switch 224 is controlled by the SCMS/CGMS effectiveness determining circuit 221 so that it supplies either of the output from the CGMS detecting circuit 218 or that from the SCMS detecting circuit 219 to the received data controlling circuit 222.

Table 1 below explains the SCMS/CGMS effectiveness determining circuit 221.

TABLE 1

| Sending device | Receiving device A (Audio device) = SCMS priority device | Receiving device B (Video device) = CGMS priority device | Receiving device C (Video device) = CGMS priority device |
|---|---|---|---|
| (1) CGMS effective SCMS effective | Recording control according to SCMS | Recording control according to CGMS | Recording control according to CGMS |

TABLE 1-continued

| Sending device | Receiving device A (Audio device) = SCMS priority device | Receiving device B (Video device) = CGMS priority device | Receiving device C (Video device) = CGMS priority device |
|---|---|---|---|
| (2) CGMS effective SCMS ineffective | Recording control with treating CGMS as SCMS | Recording control according to CGMS | Recording control according to CGMS |
| (3) CGMS ineffective SCMS effective | Recording control according to SCMS | Recording control with defining CGMS by SCMS (bit 1) | Recording control with defining CGMS by SCMS (Bit 1) |

The SCMS/CGMS effectiveness determining circuit 221 firstly determines whether SCMS copy control takes priority or CGMS copy control takes priority in the machine it belongs to. For example, when the device 201 is in an audio device such as a DAT, the SCMS/CGMS effectiveness determining circuit 221 determines that SCMS takes priority in the machine it belongs to. When, for example, the device 201 is mounted to a VCR, the SCMS/CGMS effectiveness determining circuit 221 determines that CGMS takes priority in the machine it belongs to.

When the device 201 is mounted to a machine which can be used for both audio and video application such as a DVD, the SCMS/CGMS effectiveness determining circuit 221 determines whether SCMS or CGMS takes priority in the machine it belongs to according to the mode signal. The mode signal is, for example, based on the recording mode determined by the user, which indicates whether the machine is used as audio equipment or not. The mode signal is not necessary when the machine application is set as audio equipment or equipment other than audio units.

As shown in (1) in Table 1 above, when both CGMS and SCMS contained in the transmission data from the sending device are found effective from the tcode value; the SCMS/CGMS effectiveness determining circuit 221 outputs the determination result for copy control to the switch 224 using SCMS if it is determined that SCMS takes priority in the machine, and outputs the determination result for copy control using CGMS if it is determined that CGMS takes priority in the machine.

When, as shown in (2), the copy control information in the CGMS insertion period contained in the transmission data from the sending machine alone is effective and the copy control information in SCMS insertion period is ineffective, the SCMS/CGMS effectiveness determining circuit 221 outputs the determination result for copy control based on CGMS to the switch 224 whether it is determined that CGMS takes priority in the machine or that SCMS takes the priority. In this case, if it is determined that SCMS takes priority in the machine, the received data controlling circuit 222 executes copy control as if the supplied CGMS value was the SCMS value.

On the contrary, when, as shown in (3), the copy control information in the CGMS insertion period contained in the transmission data from the sending device is ineffective and the copy control information in the SCMS insertion period alone is effective, the SCMS/CGMS effectiveness determining circuit 221 outputs the determination result for copy control based on SCMS to the switch 224 whether it is determined that SCMS takes priority or CGMS takes priority in the machine. In this case, the received data controlling circuit 222 defines CGMS according to the input SCMS for copy control. For example, the received data controlling circuit 222 defines "10" or "11" as the CGMS value when the SCMS value is "10", which permits copying only once.

Table 1 above shows an example of copy control using CGMS and SCMS contained in the transmission data. Other copy control methods may be adopted. For example, when the receiving device is a personal computer and the received data are copied to the hard disk, this receiving device is just a data streamer and cannot manage the copy generation. In this case, as shown in (3) in Table 1 above, "10" or "11" for SCMS is deemed to have "11" for CGMS when redefining CGMS by SCMS.

For video information, SCMS may not be specified. In such cases, transmission is made considering that SCMS is ineffective.

Next, operation of the second embodiment with the above configuration will be described below with reference to FIG. 21.

Figure 21:
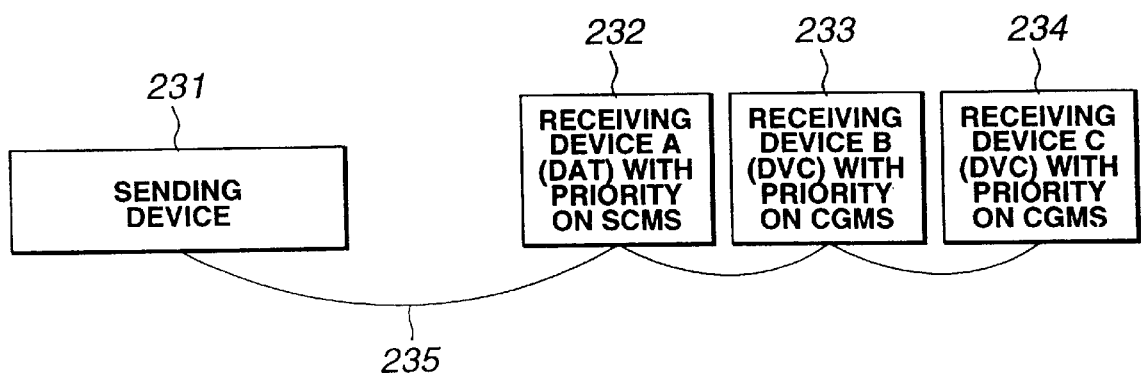
FIG. 21 illustrates the operation of the embodiment in FIG. 16.

As shown in FIG. 21, suppose a sending device 231 and three receiving devices 232 to 234 are in a daisy chain connection using a 1394 cable 235 conforming to the IEEE 1394 standard. For example, suppose the receiver A 232 is a DAT, and the receiver B 233 and the receiver C 234 are DVCs. The sending device 231 and the receiving devices 232 to 234 are provided with a device 201 of FIG. 16. Note that the sending device 231 may have transmission system circuits alone in the device 201 and the receiving devices 232 to 234 may have receiving system circuits alone in the device 201.

Suppose here the transmission data sent by the sending device 231 are received by the receiving devices 232 to 234 for copying. First of all, the devices are authenticated prior to data transmission. Specifically, the sending device 231 has the receiving device authenticating circuit 214 in the device 201 authenticate that the receiving devices 232 to 234 are proper receiving devices. The receiving devices 232 to 234 has the sending device authenticating circuit 213 in the device 201 authenticate that the sending device 231 is a proper sending device. The authentication is executed by exchange of machine authentication keys.

In this embodiment, the SCMS/CGMS effectiveness determining circuit 221 in the device 201 contained in the receiving devices 232 to 234 determines whether CGMS takes priority or SCMS takes priority in the machine.

The sending device 231 may be, for example, a VCR. The copy control information contained in the reproduced data is detected by a CGMS detecting circuit 230 in the device 201, an SCMS detecting circuit 204, an APS detecting circuit 205 and a DSB detecting circuit 206. The isochronous packet inserting circuit 210 of the sending device 231 cyclically inserts the copy control information to the reserved area of the CIP header in the isochronous packet with eight isochronous cycles. The isochronous packet inserting circuit 210 inserts the value indicating whether or not SCMS and CGMS is effective to tcode of the header in the isochronous packet. When CGMS and SCMS indicates copy prohibition or permit for copying only once, the transmission data is encrypted by the encrypting circuit 207.

Suppose now both CGMS and SGMS in the transmission data are effective. In this case, the CGMS/SCMS effectiveness flag inserting circuit 209 in the sending device 231 determines Dh as the tcode value. The isochronous packet inserting circuit 210 sets values to tCode of the header in the isochronous packet according to the output from the CGMS/SCMS effectiveness flag inserting circuit 209.

The isochronous packet from the 1394 interface 212 in the sending device 231 is sent onto the 1394 cable 235. The receiving devices A, B and C 232 to 234 fetch data from the sending device 231 flowing on the 1394 cable 235 via the 1394 interface 212 of the device 201. The 1394 receiving processing circuit 215 of the receiving devices 232 to 234 receives the isochronous packets and outputs them to the decrypting circuit 216. When the transmission data from the sending device 231 is encrypted, the decrypting circuit 216 decrypts the data and supplies the original data to the receiving data processing circuit 223.

The CGMS detecting circuit 218 of the receiving devices 232 to 234 detects the data of the CGMS insertion period from the reserved area of the CIP header in the isochronous packet extracted by the isochronous packet extracting circuit 217. For example, the CGMS detecting circuit 218 detects as CGMS the value of the cycle having a value other than "01" after three consecutive cycles having "01" at the reserved area of the CIP header in the isochronous packet. Similarly, the SCMS detecting circuit 219 detects the data of the SCMS insertion period from the reserved area of the CIP header in the isochronous packet.

CGMS and SCMS respectively detected by the CGMS detecting circuit 218 and the SCMS detecting circuit 219 are supplied via the switch 224 to the received data controlling circuit 222. In addition, the CGMS/SCMS effectiveness detecting circuit 220 detects tCode value and outputs the tcode value to the SCMS/CGMS effectiveness determining circuit 221.

It is supposed that the SCMS/CGMS effectiveness determining circuit 221 has determined for the receiving devices B and C 233 and 234, which are DVCs, that the CGMS takes priority. The tcode value is Dh and both of CGMS and SCMS are indicated to be effective. As shown in (1) of Table 1 above, the SCMS/CGMS effectiveness determining circuit 221 of the receiving devices 233 and 234 controls the switch 224 so that CGMS is selected. Thus, CGMS from the CGMS detecting circuit 218 is supplied to the received data controlling circuit 222 and the received data controlling circuit 222 controls recording by the recording system (not shown) according to the input CGMS. Specifically, when CGMS is "11", recording is prohibited; when CGMS is "10", CGMS is changed to "11" and recording is executed; and when CGMS is "00", recording is made freely.

On the other hand, for the receiving device A 232, which is an DAT, it is supposed that the priority of SCMS is determined by the SCMS/CGMS effectiveness determining circuit 221. The tcode value is Dh and both of CGMS and SCMS are indicated to be effective. As shown in (1) of Table 1 above, the SCMS/CGMS effectiveness determining circuit 221 of the receiving device 232 controls the switch 224 so that SCMS is selected. Thus, SCMS from the SCMS detecting circuit 219 is supplied to the received data controlling circuit 222 and the received data controlling circuit 222 controls recording by the recording system (not shown) according to the input SCMS. Specifically, when SCMS is "10", SCMS is changed to "11" and recording is executed, and when SCMS is "00", recording is made freely.

Next, suppose the CGMS/SCMS effectiveness flag inserting circuit 209 of the sending device 231 generates the tcode value to indicate that CGMS alone is effective and SCMS is ineffective. In this case, the SCMS/CGMS effectiveness determining circuit 221 of the receiving devices 232 to 234 has the switch 224 select the output of the CGMS detecting circuit 218. Thus, CGMS is supplied to the received data controlling circuit 222.

The received data controlling circuit 222 of the receiving devices 233 and 234, which are VCR's, executes copy control of the recording system according to CGMS. On the other hand, the receiving data controlling circuit 222 of the receiving device 232, which is a DAT, uses the CGMS value as the SCMS value. Specifically, when the input CGMS is "11", the received data controlling circuit 222 of the receiving device 232 prohibits recording of the received data; when it is "10", the circuit changes SCMS to "11" and executes recording once, and when it is "00", the circuit executes recording freely.

Suppose now SCMS alone is effective and CGMS is ineffective for the transmission data from the sending device. In this case, the SCMS/CGMS effectiveness determining circuit 221 of the receiving devices 232 to 234 has the switch 224 select the output of the SCMS detecting circuit 218. Thus, SCMS is supplied to the received data controlling circuit 222.

The received data controlling circuit 222 of the receiving device 232, which is a DAT, executes copy control of the recording system according to SCMS. On the other hand, the receiving data controlling circuit 222 of the receiving devices 233 and 234, which are DVCs, newly defines the CGMS value according to the input SCMS value. For example, when the input SCMS is "11" or "10", the received data controlling circuit 222 of the receiving devices 233 and 234 prohibits copying by the recording system with setting "11" as CGMS. When it is "00", the circuit sets the CGMS to "00" and permits free copying by the recording system.

Note that recording may be prohibited when APS is not "00" and when DSB is 1.

Thus, this embodiment achieves the same effect as the embodiment of FIG. 4 and at the same time is capable of copy control using not only CGMS but also SCMS.

In this embodiment, when the copy generation management information to be used by the receiving device is ineffective, the receiving device makes the copy generation management information corresponding to the transmitted effective copy generation management information. However, when the copy generation management information detected by the sending device is ineffective, the sending device may create a corresponding effective copy generation management information for transmission.

Figure 22:
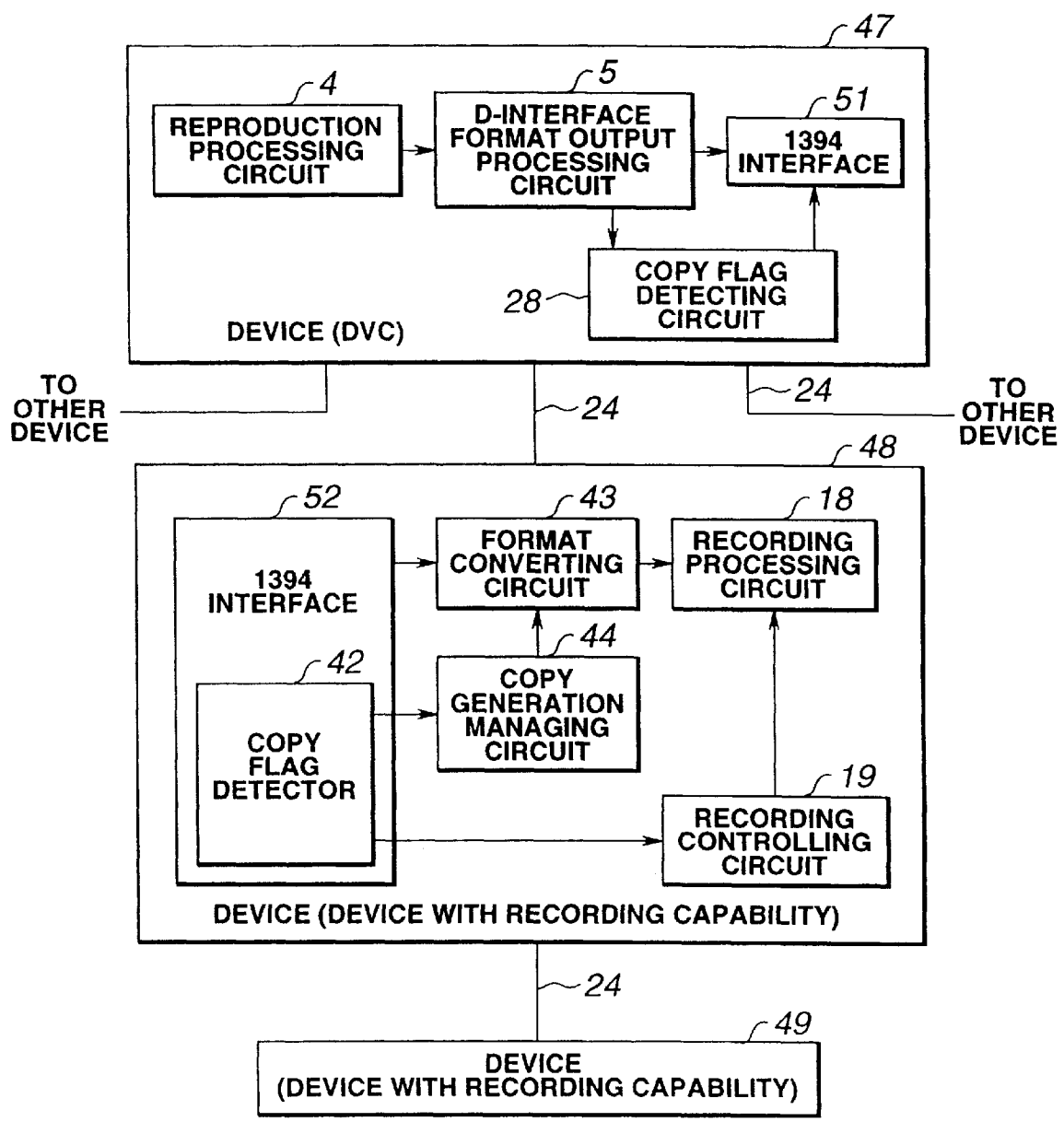
FIG. 22 is a block diagram of a third embodiment of the present invention.

FIG. 22 shows a third embodiment of the present invention. In FIG. 22, similar elements to those in FIG. 4 have the same reference numerals and their descriptions are omitted.

As shown in FIG. 22, IEEE 1394 allows a daisy chain connection and tree connection topologies. In FIG. 22, a device 47 is in a daisy chain connection with other devices (not shown) via the bus 24. Further connected to the device 47 are a device (which can be hereinafter referred to as a child device) 48 and a device (can be hereinafter referred to as a grandchild device) 49 in tree connection. It is possible for a single sending device to send synchronous data with specifying several devices including not only child devices but also grandchild devices. In the description below, the device 47 is considered to be a sending device and the devices 48 and 49 are considered to be child and grandchild devices respectively.

This embodiment is different from the one shown in FIG. 4 in that the sending device 47 adopts a 1394 interface 51 instead of the 1394 interface 27 and the receiving devices 48 and 49 adopt a 1394 interface 52 instead of the 1394 interface 41. Note that the receiving devices 48 and 49 have the same configuration.

According to IEEE 1394, bus arbitration is executed prior to data transmission. The device to transmit data generates a request command for bus utilization right. By allowing the device to have the bus utilization right in response to such request, the parent device enables data transmission. For IEEE 1394, the bus structure is automatically constructed by bus resetting with node ID assigned to each node. In the automatic bus structure construction, the devices can recognize the device names. Thus, the sending device can recognize the devices which can be used for recording among the devices in connection. For example, the sending device recognizes a DVC, a DVD and an HDD (Hard disk drive) as the recording capability devices among those in connection.

The 1394 interface 51 of the sending device converts, similarly to the 1394 interface 27, the input data into the 1394 packets and at the same time inserts the copy generation management information based on the detection result of the copy flag detecting circuit 28 to the CIP header in the 1394 packet.

In this embodiment, the 1394 interface 51 judges whether there are several recording capability devices when the copy generation management information to allow copying only once ("10") is detected by the copy flag detecting circuit 28. When detecting that there are several devices capable of recording, the 1394 interface 51 uses the asynchronous command to send the copy generation information for permitting copying only once to the predetermined device alone and to send the copy generation information for copy prohibition to the other devices. For example, the 1394 interface 51 sends the copy generation information for copy prohibition to the recording capability device 49, which is connected as a grandchild.

The 1394 interface 52 of the receiving devices 48 and 49 is, as is the 1394 interface 41, provided with a copy flag detector 42. It depackets the input 1394 packets and detects the copy generation management information inserted in the CIP header. In this embodiment, the 1394 interface 52 further detects the copy generation information transmitted by the asynchronous command. When the copy generation information is detected in the asynchronous command, the 1394 interface 52 provides priority to the detection result of the copy generation information over the copy generation management information inserted in the CIP header an outputs the former to the copy generation managing circuit 44 and the recording controlling circuit 19. Thus, the receiving devices 48 and 49 execute recording according to the copy generation information.

In the embodiment with the above configuration, the devices recognize the device names during bus resetting. When the copy generation management information contained in the reproduced data is "11" for copy prohibition or "00" for free copying, the sending device makes the same operation as the embodiment of FIG. 4. Specifically, the copy generation management information detected by the copy flag detecting circuit 28 of the sending device is inserted in the CIP header by the 1394 interface 51 in this case.

The 1394 packets are transmitted via the bus 24 and fetched by the 1394 interface 52 of the receiving devices 48 and 49. The 1394 interface 52 depackets the 1394 packets and at the same time detects the copy generation management information in the CIP header by the copy flag detector 42. The copy generation managing circuit 44 and the recording controlling circuit 19 are controlled based on such copy generation management information so that the recording is executed according to the copy generation management information.

On the other hand, when the copy generation management information in the reproduced data is "10" to permit copying only once, the 1394 interface 51 inserts the copy generation management information "10" into the CIP header and at the same time transmits the copy generation information to permit copying only once by the asynchronous command addressed to the child device 48 and transmits the copy generation information for copy prohibition by the asynchronous command addressed to the grandchild device 49.

When detecting the copy generation information permitting copying only once from the asynchronous command, the 1394 interface 52 of the child device 48 outputs this detection result to the copy generation managing circuit 44 and the recording controlling circuit 19. Thus, the data from the device 47 can be recorded at the child device 48. Note that the copy generation managing circuit 44 changes the copy generation management information to "11" here, as in the embodiment of FIG. 4.

On the other hand, the 1394 interface 52 of the grandchild device 49 detects the copy generation information for copy prohibition from the asynchronous command. The detection result of the copy generation information is supplied to the recording controlling circuit 19 and recording is not executed at the grandchild device 49.

Thus, this embodiment achieves the same effect as that of FIG. 4 and at the same time enables a predetermined device alone among several devices capable of recording to execute recording so that the copyright holder's protection is improved and repeated recording can be effectively prevented.

Figure 24:
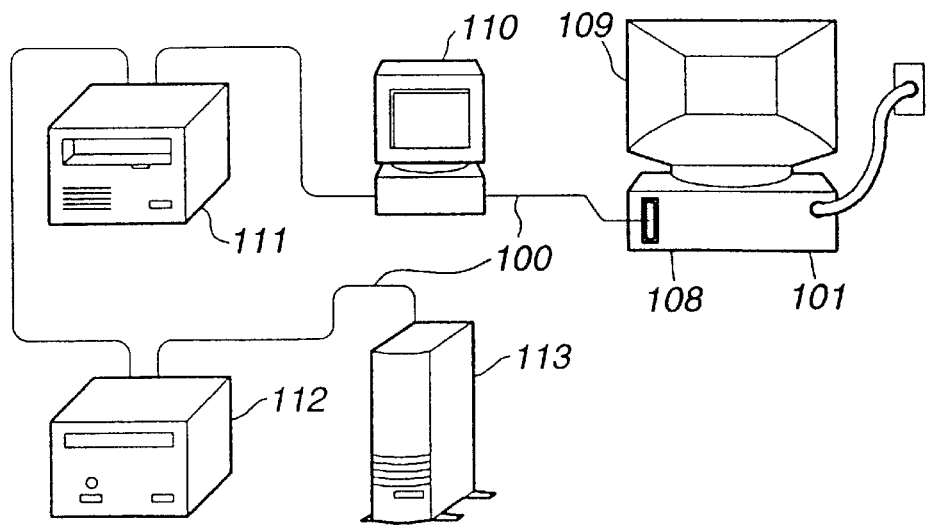
FIG. 24 is a general view of the embodiment in FIG. 23.
Figure 25:
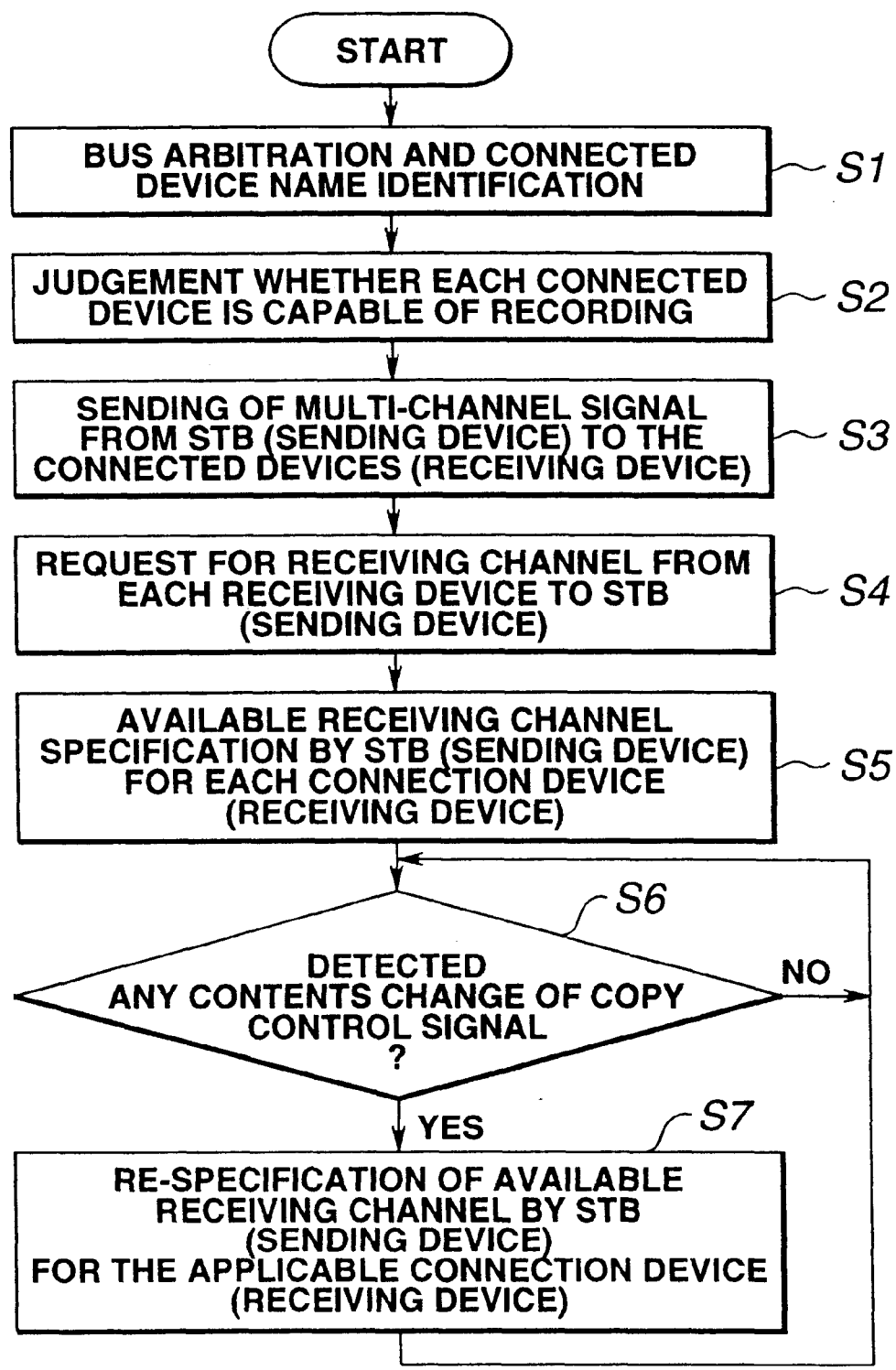
FIG. 25 is a flowchart illustrating the procedure of the copy control method in the embodiment of FIG. 23.
Figure 26:
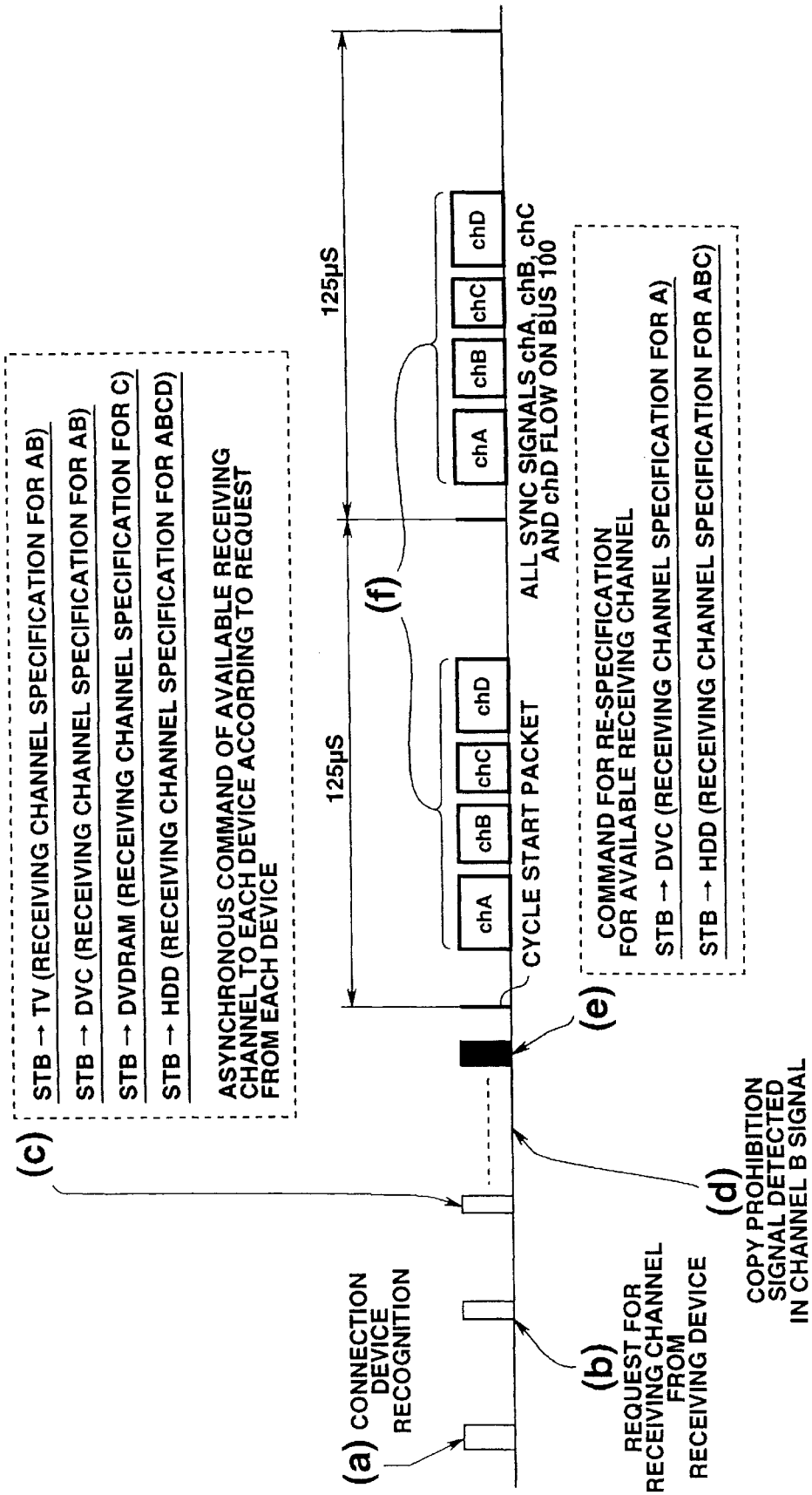
FIG. 26 is a diagram showing chronologically an example of communications between the isochronous packet and the asynchronous packet in the embodiment of FIG. 23.

FIGS. 23 through 29 show a fourth embodiment of the present invention. FIG. 23 is a block diagram, and FIG. 24 is a general view. FIG. 25 is a flowchart illustrating the copy control method procedure in the embodiment of FIG. 23, and FIG. 26 chronologically shows an example of communications between the isochronous packet and the asynchronous packet flowing on the IEEE 1394 cable. FIGS. 27 to 29 show the isochronous packet and the asynchronous command.

In this embodiment, several devices connected in a network are controlled for copy generation control by a single device using asynchronous data. For the copy generation management information, it is sufficient in this embodiment that the parent device among the devices supports the digital format of the devices. Other devices may have an interface for IEEE 1394 standard only.

In FIG. 23, a set top box (hereinafter referred to as an STB) 101 is connected to devices 110 to 113 via a bus 100. Input to the STB 101 is digital mufti-channel broadcasting signals consisting of multiplexed four channels cha, chb, chc, and chd, for example. Such mufti-channel broadcasting signals are, for example, subjected to QPSK modulation before transmission as packets. The STB 101 can display the program transmitted by the input mufti-channel broadcasting signals on a display device 109 and convert the mufti-channel broadcasting signals into digital format data corresponding to the devices 110 to 113 for transmission to the bus 100.

Specifically, the mufti-channel broadcasting signals are supplied to a decoding circuit 102 of the STB 101. The decoding circuit 102 executes the decoding process corresponding to the mufti-channel broadcasting signals (QPSK decoding, for example) and outputs the result to an error correction circuit (hereinafter referred to as an ECC) 103. The ECC 103 corrects sign errors occurred during transmission and outputs the mufti-channel broadcasting signals to a decoder 104 and a data format converting circuit 105. The decoder 104 decodes the multi-channel broadcasting signals and outputs the decode signals to the display unit 109. The display device 109 executes display according to the decode signals from the decoder 104.

The data format converter 5 converts the output from the ECC 103 into the predetermined digital data format and outputs the result to a copy flag detecting circuit 106 and a 1394 controlling circuit 108. The copy flag detecting circuit 106 extracts the copy flag (CGMS-D: Copy Generation Management System-Digital, for example) from the digital multi-channel broadcasting signals supplied from the ECC 3 for each channel and outputs it to the 1394 controlling circuit 108. The 1394 controlling circuit 108 converts the output from the data format converting circuit 105 to the data in the data format for isochronous transmission according to IEEE 1394 standard and outputs the result to the decoder 104 and to the bus 100.

The bus 100 is an IEEE 1394 cable, for example. It is connected to the devices 110 to 113 having 1394 controlling circuits 108a to 108d with the configuration similar to that of the 1394 controlling circuit 108. The devices 110 to 113 are, for example, a television set (TV), a DVC, a DVC-RAM, and an HDD respectively.

Next, referring to FIGS. 23 through 29, operation of this embodiment with the above configuration is described below.

The STB 1 in FIG. 23 receives the digital mufti-channel broadcasting signals, converts the data format into the IEEE 1394 format, and transmits the data to the devices 110 to 113 via the bus 100 such as an IEEE 1394 cable. The devices 110 to 113 receives the channel it desires only from the channels supplied from the STB 101 via the bus 100. The copy control uses IEEE 1394 functions, such as command setting, when the devices capable of transmission data recording among the devices 110 to 113 are to record the desired channel.

Referring to FIG. 25, application of this embodiment is described below. In the following description, the STB 101 is a sending device and the devices 110 to 113 are receiving devices. Since the sending device usually plays the role of parent in IEEE 1394, the STB 101 is supposed to be the parent in the description below.

The STB 101 uses the isochronous transmission function (synchronous transmission) to always transmit the mufti-channel broadcasting signals via the IEEE 1394 bus 100 while receiving the mufti-channel broadcasting signals and controls copying by asynchronous communication with the devices using asynchronous transmission function.

According to IEEE 1394, the topology is automatically set when the power is turned on or when the devices are connected or disconnected. It is executed by a controller circuit (not shown) in the physical layers of the 1394 controlling circuits 108 and 108a to 108d. The automatic topology setting is executed in three steps: first, the bus is reset, then the connection structure is checked, and finally, the nodes notify their node numbers to other nodes.

Upon completion of automatic topology setting, IEEE 1394 executes the bus arbitration as in the case of SCSI. Bus arbitration is always executed before the data transmission by the devices. The parent device STB 101 determined by the automatic topology setting makes inquiry for device name identification to the devices (child devices) connected to the bus 100 of IEEE 1394. Then, the STB 101 recognizes that the connected devices 110 to 13 are, for example, a TV, a DVC, a DVD-RAM, and an HDD according to the response from the devices 110 to 113 (See FIG. 26(a)). (Step S1).

Thus, by preparing a correspondence table comparing the device names and their capability of recording in its own memory space, for example, the parent device (STB 101) can judge that the device 110, which is a TV, is not capable or recording, and the devices 110 to 113, which are a DVC, a DVDRAM and an HDD, are capable of recording (Step S2). Upon completion of such bus arbitration, the STB 101 transmits the digital multi-channel broadcasting signals converted into the IEEE 1394 packets (FIG. 26(f)) to the devices 111 to 113 using the IEEE 1394 isochronous transmission function via the bus 100 of IEEE 1394 (Step S3).

Suppose now the user tries to display or record the digital multi-channel broadcasting with a device (child device). Suppose, for example, the user wants to see two programs on channels A and B on the two screens of the device 110 as a TV, makes channel selections for these two channels, wants to record two programs on channels A and B to the device 111 as a DVC and sets the recording switch of the device 111, sets the recording switch of the device 112 to record a program on channel C to the device 112 as a DVD-RAM, and sets the device 113 to record the data on all 4 channels to the device 113 as an HDD. Each of the devices 110 to 113 transmits the receiving channel request (FIG. 26(b)) to the STB 101 as an asynchronous command by the asynchronous transmission function of IEEE 1394 (Step S4). Note that there are various operation methods for receiving or recording the digital multi-channel broadcasting at various devices and the method is not limited to that in this embodiment. Besides, the asynchronous command sent from each of the devices 110 to 113 to the STB 101 is expressed (schematized) as a single packet in FIG. 26, but the actual number of packets depends on the number of the requesting devices. Further, the asynchronous command from the receiving device to the STB is configured as a packet as shown in FIG. 27.

On the other hand, the isochronous data sent from the STB 101 are transmitted in this embodiment with the digital multi-channel broadcasting for four channels always sent to the receiving devices via the bus 100 of IEEE 1394. The receivable channels for the receiving devices are determined by the receivable channels specified by the asynchronous command sent for each receiving device from the sending device transmitting the isochronous data. Specifically, upon receipt of receiving channel requests from receiving devices at Step S4, the STB 101 specifies the receivable channel among the four channels A, B, C, D, to the receiving devices serving as the origins of the receiving channel requests (Step S5). Note that the asynchronous command sent from the STB 101 to each receiving device is configured as a packet as shown in FIG. 28. The isochronous packet, which contains the digital multi-channel broadcasting for four channels are configured as packets as shown in FIG. 29.

Step S4 may be omitted here. Suppose the STB 101 has been already turned on and IEEE 1394 is then turned on, for example. When the sending device has detected in advance that the copy prohibition signal is inserted in the isochronous packets corresponding to one or more channel numbers to be sent from the sending device to the receiving device, the procedure can be designed as follows: the receiving device does not send the receiving channel request to the sending device; the sending device transmits one-way specification of the receivable channel numbers after automatic setting of the network topology, while deleting the channel numbers having the copy prohibition signal inserted in the receiving devices (S5).

Suppose now all four channels of the digital multi-channel broadcasting under transmission can be freely copied. The STB 101 sends the following asynchronous command to the receiving devices in this case. As shown in FIG. 26(c), chA and chB are specified as the receivable channels for the device 110 as a TV, chA and chB are specified as the receivable channels for the device 11 as a DVC, chC is specified as the receivable channel for the device 112 as a DVD-RAM, and chA/chB/chC/chD are specified as the receivable channels for the device 113 as an HDD. Upon receipt of such specifications, the receiving devices can receive the channel broadcasting signals they desire.

As shown in FIG. 23, the multi-channel broadcasting signals are decoded by the STB 101 and converted into the isochronous packets of IEEE 1394, with the video data, audio data and character data identified based on the contents of the header in the multi-channel broadcasting signal packets. Therefore, the STB 101 can recognize various information including the copy generation management information added to the header of the multi-channel broadcasting signals.

On the other hand, as described above, in the transport packet of MPEG2 method, which is the most prosperous method of video compression in digital broadcasting, the copy generation management information (CGMS-D) is inserted in the link level header. The STB 101 can easily detect the copy generation management information contained in the transport stream of MPEG2.

If, at the timing shown in FIG. 26(d), the copy prohibition signal "11" is detected as the copy generation management information (CGMS-D) of the channel b in the multi-channel broadcasting signal, for example, the 1394 controlling circuit 108 of the STB 101 resets the receivable channels to the devices sending the receiving request for channel B (Steps S6, S7). Specifically, it specifies chA as the receivable channel for the device 111 (DVC) and specifies chA/chC/chD as the receivable channels to the device 113 (HDD). The receiving devices 111 and 113 receiving such a specification cannot receive chB among the desired channels in the broadcasting signal (copy protection). Since the device 110 (TV set) is not capable of recording and the device 112 (DVD-RAM) has not specified chB from the beginning, there is no need of receivable channel resetting for them.

In practicing copy protection, when the user cannot execute recording though he/she specifies a channel for recording to a device capable of recording, he/she may misunderstand that it is caused by operation setting error of the device capable of recording or by a device failure. To prevent this, a notification function to notify the user of the reason for recording rejection may be added. For example, when the receiving request from a recording capability device contains a channel number for which copying is prohibited, the STB or any other sending device which receives the receiving request sends, together with or separately from the asynchronous command to specify the receivable channel numbers with deleting the copy prohibition channels, the information that the copying of the applicable channel in the receiving request is prohibited to the receiving device as the origin of the receiving request or one of the devices connected to the IEEE 1394 network to notify the user of such information via a display device on the device such as a CRT, an LED or an LCD. Alternatively, when the recording capability device cannot obtain the receiving permit for a channel it requested for receiving, such receiving device may notify the user that the channel is prohibited for copying via a display device on such receiving device.

After that, upon detection of "10" or "00" as the copy generation management information of channel B-in-the-multi-channel broadcasting signals, the receivable channels are reset for the device 111 (DVC) or the device 113 (HDD) (Steps S6, S7). Specifically, chA and chB are specified as the receivable channels for the device 111 and chA/chB/chC/ chD are specified as the receivable channels for the device 113 respectively. Thus, the devices 111 and 113 can receive all channels in the broadcasting signals they have requested. Note that the procedure of the steps S3 to S7 is executed at the application layer of the devices and the 1394 controlling circuits 108, 108a to 108d of the STB 101. The above procedure including steps S1 and S2 can be at present achieved completely by the communication protocols and commands as set forth in IEEE 1394 and IEEE 1394 T.A. (Trade Association).

In addition to the above method, copy protection for recording capability device may be also achieved by directly sending the recording permit/prohibition information for every channel to the receiving device by writing to the "Receivable channel specification command" to be sent as the asynchronous command from the STB 101. This method is not currently covered by any command as set forth in IEEE 1394 and IEEE 1394 T.A. (Trade Association). This method can be achieved by adding commands.

Though the sending device is supposed to be the STB 101 in the above description, any device can be the sending device according to the IEEE 1394 specification. For example, as a sending device other than the STB 101, the device 111 (DVC) which reproduces and outputs the video images recorded as multi-channel data or other devices 110, 112 or 113 can achieve the above operation. Further, even when sending devices other than those sending the multi-channel signals chA/chB/chC/chD are connected to the bus 100 such as that of IEEE 1394 and chE is transmitted on the same bus as in the case when there are two or more sending devices, the sending device to send chE signal can detect the copy generation management information during packet data conversion and specify the receivable channels to the receiving devices by sending the asynchronous command as does a sending device sending chA/chB/chC/chD, and thereby control copying according to the copy generation management information for all signals chA/chB/chC/chD/ chE.

Further, when the device 112 (DVD-RAM) is by the asynchronous command requesting receiving of channel C only, if the STB 101 detects the copy prohibition signal "11" for channel C with its copy flag detecting circuit 106, the STB 101 as the sending device may send an asynchronous command to the device 112 as a recording capability device to specify a number which cannot be a receivable channel number or a number which does not exist as an isochronous data channel in the "Receivable channel specification command" or may send no "Receivable channel specification command" in order to achieve copy protection for the device 112 as the DVD-RAM. In the former case, the receiving device keeps waiting for the signal corresponding to the non-existing channel number specified by the STB 101 and results in a receiving failure. In the latter case, without any specification of receivable channels from the STB 101, the receiving device cannot receive any signal. As a result, the device 112 can be kept from copying.

Figure 30:
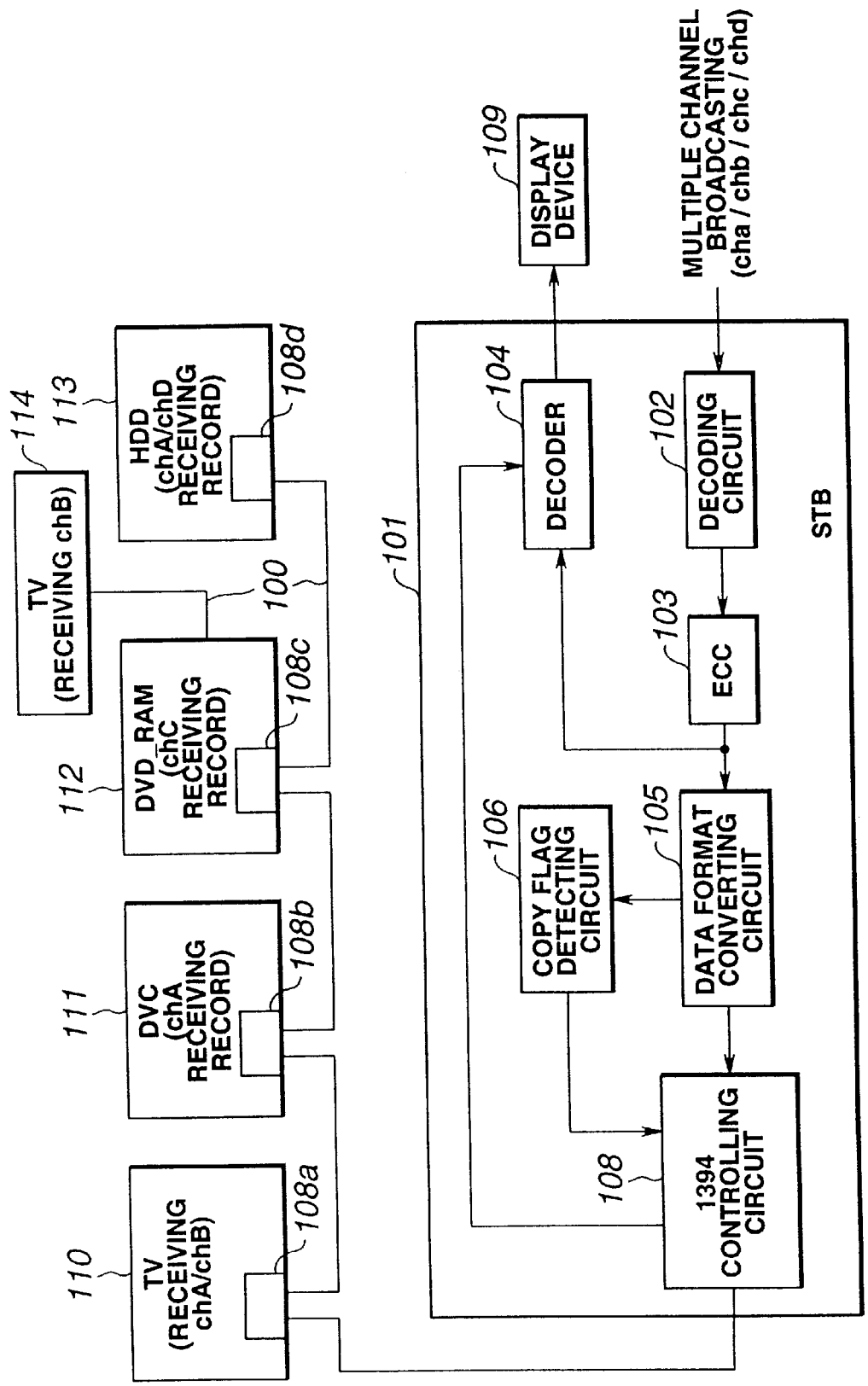
FIG. 30 is a block diagram of a variation of the embodiment of FIG. 23.

As described above, IEEE 1394 allows not only the daisy chain connection topology, but also the tree type topology. FIG. 30 is a block diagram to illustrate an example of daisy chain plus tree type topology.

FIG. 30 shows a modification of the embodiment of FIG. 23. A device 114 is added to the device 112 in FIG. 23 in a tree connection using the bus 100 of IEEE 1394. The device 114 is, for example, a TV set. Even with such a connection, all isochronous packets for four channels are transmitted on the bus 100 of IEEE 1394 and, even if channel C only is transmitted to the device 112, the device 114 can receive any signal from channels A, B, C and D. In this case, however, it is necessary to output the receiving request command by asynchronous command. Besides, as shown in FIG. 30, even when the channel B and channel C are under copy prohibition status, the device 114 can receive any signal from the channels A, B, C and D. In other words, the device 114 is in the tree structure under the device 112 (DVDR.AM) from the viewpoint of topology, but can be placed in a configuration similar to that in a daisy chain connection with the STB 101 when considered logically.

Then, as a copy control method with the copy generation management information, scrambling copy control by changing the transmission order of the transmitted packets on the IEEE 1394 will be described below.

Figure 31:
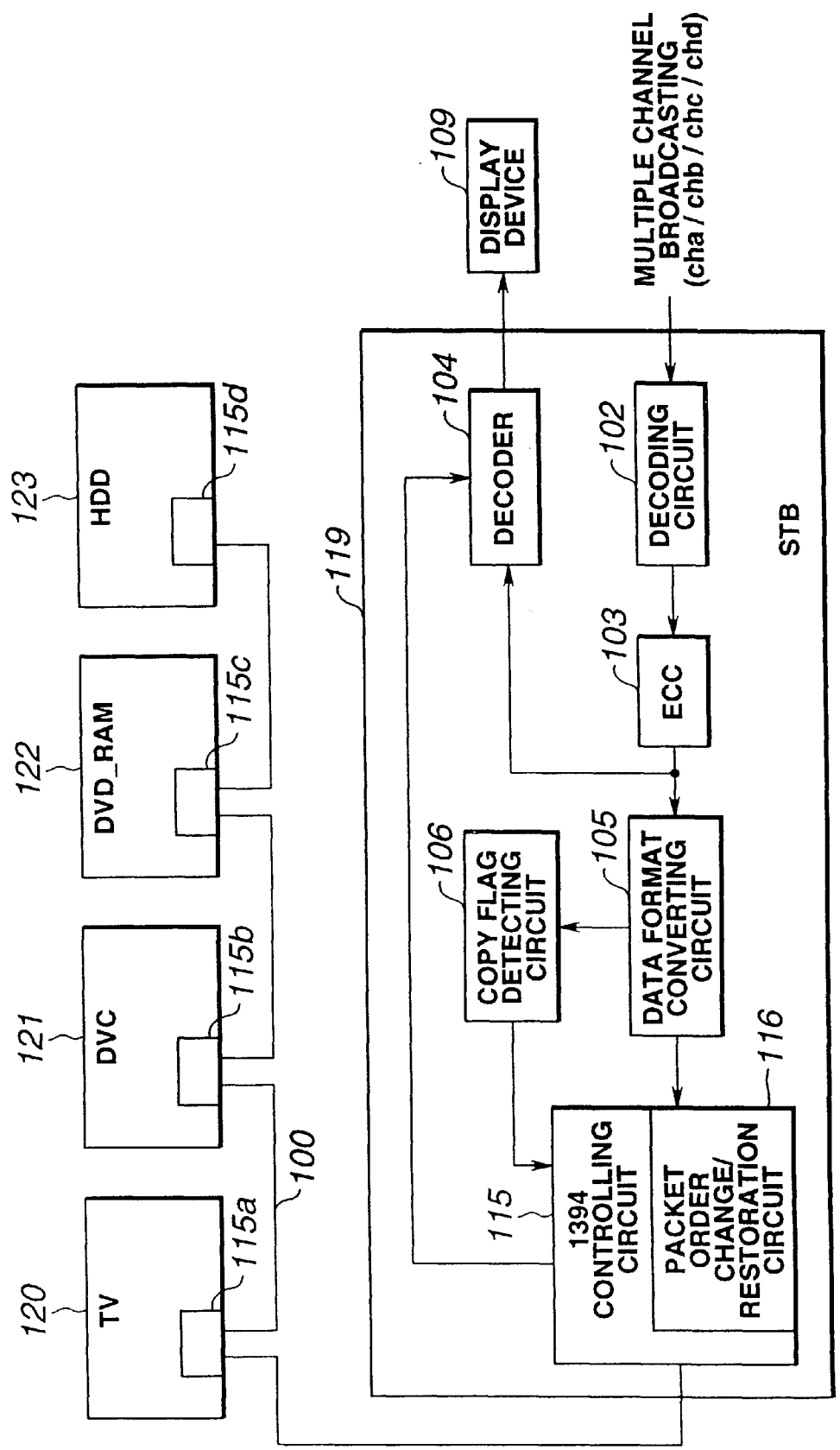
FIG. 31 is a block diagram of a fifth embodiment of the present invention.

FIG. 31 is a block diagram of a fifth embodiment of the present invention. FIGS. 32 and 33 illustrate the asynchronous command sent from the STB 119 of FIG. 31 to the receiving devices. In FIG. 31, similar elements as those in FIG. 23 have the same reference numerals and their descriptions are omitted.

The STB 119 in this embodiment is different from the STB 101 of FIG. 23 in that a 1394 controlling circuit 115 is adopted, instead of the 1394 controlling circuit 108. Connected to the bus 100 are the STB 119 as well as the devices 120 to 123; which have 1394 controlling circuits 115a to 115d with the same configuration as the 1394 controlling circuit 115. The devices 120 to 123 are, for example, a TV, a DVC, a DVD-RAM, and an HDD respectively.

The 1394 controlling circuit 115 is provided with a packet order change/restoration circuit 116. The packet order change/restoration circuit 116 can provide scrambling by changing the chronological order of the isochronous data on the IEEE 1394 for the channels and restore the scrambled data. The 1394 controlling circuit 115 is designed to enable sending of the scramble cancellation key to cancel scrambling by means of the asynchronous command.

On the other hand, the IEEE 1394 controlling circuits 115a to 115d provided on the receiving devices 120 to 123 have the same function as the IEEE 1394 controlling circuit 115. Upon receipt of the scramble cancellation key, they can cancel the scrambling on the isochronous data.

The 1394 controlling circuit 115 in the above configuration is provided with a buffer (FIFO memory) to store packet data for some cycles required (used) in format conversion when the data packets of the digital multi-channel broadcasting (chA/chB/chC/chD) are converted for transmission on the bus 100 of IEEE 1394.

Among the digital multi-channel broadcasting signals (chA/chB/chC/chD), the channel signals with the copy prohibition signal inserted are subjected to control of the buffer by the packet order change/restoration circuit 116 during data packet format conversion so that the chronological order of the IEEE 1394 packets is changed for scrambling and the IEEE 1394 packets are sent to the bus 100 with such scrambled order.

Upon request for a channel with the copy prohibition signal by the asynchronous receiving request command from one of the receiving devices 120 to 123, the scramble cancellation key to show the appropriate packet order, as shown in FIG. 32, is sent to the recording incapability devices together with the usual data of receivable channel numbers or responses by two separate asynchronous commands are returned to the device.

To the recording capability devices, in contrast, usual data of receivable channel numbers alone as shown in FIG. 33 are sent, or the usual receivable channel numbers and an inappropriate scramble cancellation key are sent together as the response by the asynchronous command, or no response is returned.

Thus, the recording incapability device can, based on the proper scramble cancellation key, properly restore the received isochronous packets in order but the recording capable device cannot obtain the proper scramble cancellation key and cannot properly restore the received isochronous packets in order, which achieves copy protection.

Strictly speaking, the recording capability devices can record the data. However, the changed order of the data packets prevent proper reproduction of the original video data in reproduction of the recorded data by such devices, which results in the effect of copy protection. Further, this packet scrambling can be easily realized by scrambling the order of the IEEE 1394 packets within the range of the FIFO memory in the P1394 circuit 115 of FIG. 31, or within the number of packets corresponding to one frame of image.

Though the embodiment of FIG. 31 achieves copy protection by sending the data after scrambling the order of IEEE 1394 packets, copy protection can be also achieved without scrambling of the packet order by encrypting the data in the packet. An example of encryption is to scramble the data order in a packet and to send the scramble cancellation key showing the appropriate data order in the packet to the recording incapability devices and send improper scramble cancellation key to the recording capability devices. Thus, the recording incapable device can properly restore the received data in the isochronous packet in order according to the proper scramble cancellation key, but the recording capable devices without the appropriate scramble cancellation key cannot properly restore the received data in the isochronous packet in order, which achieves copy protection.

Obviously, various different embodiments in a wide range can be made based on the prevent invention within the spirit and scope of the invention. The present invention is defined by the appended claims only, and is not restricted by any specific embodiment.

As described above, a device having a digital interface and a network system using such a device as well as a copy protection method according to the present invention are useful in copy control for audio and video equipment. They are, for example, suitable to be used in a system which makes copying by transmitting data via a network conforming to the IEEE 1394 standard.

What is claimed is:

1. A device having a digital interface, comprising:

a sending interface, said sending interface comprising a format converter to which at least one original signal in at least one predetermined data format is input which converts said at least one original signal in said at least one predetermined data format to data in a data format common to a network bus, said sending interface inserts copy generation management information into a signal after format conversion by said format converter with a data format corresponding to said data format of said network bus before sending said data to said network bus;

a receiving interface which receives a transmitted signal sent from said sending interface by said network bus and restores said data format of said received signal from said data format of said network bus to an original data format of said original signal before outputting; and a common detector detects said copy generation management information as inserted into said received signal with said data format corresponding to said data format of said network bus.

2. A device having a digital interface, comprising:

a sending interface, said sending interface comprising a format converter to which at least one original signal in at least one predetermined data format is input which converts said at least one original signal in said at least one predetermined data format to data in a data format common to a network bus, said sending interface inserts copy generation management information into a signal after format conversion by said format converter with a data format corresponding to said data format of said network bus before sending said data to said network bus.

3. A device having a digital interface, comprising:

a receiving interface which receives a transmitted signal, which is obtained by converting at least one original signal in at least one predetermined format containing copy generation management information to data in a data format of a network bus and into which said copy generation management information is inserted with a data format corresponding to said data format of said network bus by said network bus, and restores said data format of said received signal from said data format of said network bus to an original data format of said original signal before outputting; and a common detector which detects said copy generation management information as inserted into said received signal by said receiving interface with said data format corresponding to said data format of said network bus.

* * * * *